(12) United States Patent
Sharma et al.

(10) Patent No.: US 7,583,468 B2
(45) Date of Patent: *Sep. 1, 2009

(54) METHOD AND APPARATUS OF DUAL STAGE SERVO CONTROL WITH DUAL CONTROL PATHS AND DECOUPLING FEEDBACK FOR TRACK FOLLOWING IN A HARD DISK DRIVE

(75) Inventors: Vinod Sharma, Los Gatos, CA (US); Hyung Jai Lee, Cupertino, CA (US); Dong Jun Lee, Sunnyvale, CA (US)

(73) Assignee: Samsung Electronics Co., Ltd., Suwon (KR)

(*) Notice: Subject to any disclaimer, the term of this patent is extended or adjusted under 35 U.S.C. 154(b) by 9 days.

This patent is subject to a terminal disclaimer.

(21) Appl. No.: 11/270,940

(22) Filed: Nov. 10, 2005

(65) Prior Publication Data
US 2006/0061902 A1 Mar. 23, 2006

Related U.S. Application Data

(63) Continuation-in-part of application No. 10/886,171, filed on Jul. 6, 2004, now Pat. No. 7,009,803.

(51) Int. Cl.
*G11B 5/596* (2006.01)
(52) U.S. Cl. .................................... 360/77.02
(58) Field of Classification Search ........................ None
See application file for complete search history.

(56) References Cited

U.S. PATENT DOCUMENTS

| | | | | |
|---|---|---|---|---|
| 6,088,187 A | * | 7/2000 | Takaishi | 360/78.05 |
| 6,101,058 A | * | 8/2000 | Morris | 360/69 |
| 6,493,177 B1 | * | 12/2002 | Ell et al. | 360/78.05 |
| 6,741,417 B2 | * | 5/2004 | Hsin et al. | 360/78.05 |
| 6,747,836 B2 | * | 6/2004 | Stevens et al. | 360/78.05 |
| 6,975,477 B1 | * | 12/2005 | Hu et al. | 360/71 |

(Continued)

OTHER PUBLICATIONS

Guo, Lin et al., Dual-stage Actuator Servo Control for High Density Disk Drives, IEEE/ASME International Conference on Advanced Intelligent Mechatronics, Sep. 19-23, 1999, 6 pages, Atlanta, USA.

(Continued)

*Primary Examiner*—K. Wong
(74) *Attorney, Agent, or Firm*—GSS Law Group; Earle Jennings

(57) ABSTRACT

A magnetic head follows a track in a hard disk drive as positioned by micro-actuator and voice coil motor. Embodiments operate two control paths. The micro-actuator control path generates a version of micro-actuator control signal stimulating the micro-actuator. The voice coil motor control path generates a version of voice coil control signal, amplified based upon tuning gain to stimulate voice coil motor. A decoupling feedback filter decouples these control paths, using the micro-actuator control signal version. Either control path may include a notch filter. A track following command, with PES removed, directs the micro-actuator control. The servo-controller may digitally support the invention, which may include the servo-controller program system. An implementation may be optimized within a hard disk drive, possibly as part of the manufacturing process. The hard disk drive is a product of that process.

34 Claims, 16 Drawing Sheets

U.S. PATENT DOCUMENTS

| | | | |
|---|---|---|---|
| 7,009,803 B2 * | 3/2006 | Sharma et al. | 360/77.02 |
| 7,019,938 B2 * | 3/2006 | Miyata et al. | 360/78.05 |
| 2004/0125488 A1 | 7/2004 | Zhu et al. | |

OTHER PUBLICATIONS

Bell, Jon, Tunable Multi Notch Digital Filters, Sep. 27, 2000, 7 pages.

* cited by examiner

METHOD AND APPARATUS OF DUAL STAGE SERVO CONTROL WITH DUAL CONTROL PATHS AND DECOUPLING FEEDBACK FOR TRACK FOLLOWING IN A HARD DISK DRIVE

CROSS-REFERENCES TO RELATED APPLICATIONS

This application is a continuation in part of U.S. application Ser. No. 10/886,171, filed Jul. 6, 2004, now U.S. Pat. No. 7,009,803, the specification of which is hereby incorporated by referenced in its entirety.

TECHNICAL FIELD

The present invention relates to the control of a hard disk drive, in particular, to the servo mechanism and method, controlling a voice coil motor and a micro-actuator, positioning a read-write head in a hard disk drive.

BACKGROUND OF THE INVENTION

Hard disk drives contain one or more magnetic heads coupled to rotating disks. The heads write and read information by magnetizing and sensing the magnetic fields of the disk surfaces. Typically, magnetic heads have a write element for magnetizing the disks and a separate read element for sensing the magnetic field of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is embedded in a slider. The slider mechanically couples to an actuator arm by a head suspension assembly. The head suspension assembly includes a load beam connected to the actuator arm by a spring or hinge coupling. The slider attaches to a flexure arm and the flexure attaches to the load beam to form a head gimbal assembly (HGA). The head gimbal assembly includes the head suspension assembly, the flexure and the slider. Each head gimbal assembly is swaged to the actuator arm through its base plate. The actuator arms rigidly couple to a voice coil motor that moves the heads across the surfaces of the disks.

Information is stored in essentially radial tracks that extend across the surfaces of each disk. Each track is typically divided into a number of segments or sectors. The voice coil motor and actuator arm can move the heads to different tracks of the disks and to different sectors of each track.

A suspension interconnect extends along the length of the flexure and connects the head to a preamplifier. The suspension interconnect typically includes a pair of conductive write traces and a pair of conductive read traces.

The Tracks Per Inch (TPI) in hard disk drives is rapidly increasing, leading to smaller and smaller track positional tolerances. The track position tolerance, or the offset of the magnetic head from a track, is monitored by a signal known as the head Positional Error Signal (PES). Track Mis-Registration (TMR) occurs when a magnetic head loses the track registration. TMR is often a statistical measure of the positional error between a magnetic head and the center of an accessed track.

Today, the bandwidth of the servo controller feedback loop, or servo bandwidth, is typically around 1.1 KHz. Extending servo bandwidth, increases the sensitivity of the servo controller to drive the voice coil actuator to ever finer track positioning. Additionally, it decreases the time for the voice coil actuator to change track positions. Extending servo bandwidth is difficult, and has not significantly improved in years.

However, as track densities increase, the need to improve track positioning, and servo bandwidth, increases. One answer to this need involves integrating a micro-actuator into each head gimbal assembly. These micro-actuators are devices typically built of piezoelectric composite materials, often including lead, zirconium, and titanium. The piezoelectric effect generates a mechanical action through the application of electric power. The piezoelectric effect of the micro-actuator, acting through a lever between the slider and the actuator arm, moves the magnetic head over the tracks of a rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, which effectively extends the servo bandwidth. The single wire approach to controlling one micro-actuator provides an AC (alternating current) voltage to one of the two leads of the piezoelectric element. The other lead is tied to a shared ground. The two wire approach drives both leads of one micro-actuator.

There are two approaches to integrating the micro-actuator into a head gimbal assembly. The first embeds the micro-actuator between the slider and the load beam, creating a co-located micro-actuator. The second embeds the micro-actuator into the load beam, creating a non co-located micro-actuator. The non co-located micro-actuators tend to consume more power, requiring higher driving voltages than the co-located micro-actuators.

A problem arises when integrating micro-actuators into hard disk drives with multiple disk surfaces. Each of the micro-actuators requires its leads to be controlled by the servo-controller. These leads are coupled to wires, which must traverse the bridge flex or the long tail portion of the suspension to get to the main flex circuit. The bridge flex circuit provides electrical coupling to the leads of the micro-actuator.

The main flex circuit constrains many components of the actuator arm assembly within a voice coil actuator. If the shape or area of the main flex circuit is enlarged, changes are required to many of the components of the actuator arm assembly and possibly the entire voice coil actuator. Changing many or most of the components of an actuator arm assembly, leads to increases in development expenses, retesting and recalibrating the production processes for reliability, and inherently increases the cost of production.

The existing shape and surface area of the main flex circuit has been extensively optimized for pre-existing requirements. There is no room in the main flex circuit to run separate control wires to each micro-actuator for multiple disk surfaces. This has limited the use of micro-actuators to hard disk drives with only one active disk surface.

SUMMARY OF THE INVENTION

The invention controls a magnetic head following a track in a hard disk drive. The magnetic head is positioned by a micro-actuator and a voice coil motor.

Each embodiment of the invention operates as two control paths. The micro-actuator control path includes the micro-actuator control generating a micro-actuator control signal based upon a micro-actuator direction. A version of the micro-actuator control signal stimulates the micro-actuator. The voice coil motor control path includes the following. The voice coil motor control generates a version of the voice coil control signal, which is amplified based upon a tuning gain to stimulate the voice coil motor. These control paths are decoupled by a decoupling feedback filter, which uses the version of the micro-actuator control signal to create the decoupling feedback signal.

A first embodiment of the invention uses the voice coil motor control path with notch filtering. The version of the voice coil control signal is notch one filtered to remove at least one significant excitation resonance to create a notch filtered voice coil control signal. Amplifying the notch filtered voice coil control signal based upon a tuning gain stimulates the voice coil motor.

A second embodiment of the invention uses the voice coil motor control path and the micro-actuator control path with notch filtering. The version of the voice coil control signal is notch one filtered to remove at least one first significant excitation resonance to create a notch filtered voice coil control signal. Amplifying the notch filtered voice coil control signal based upon a tuning gain stimulates the voice coil motor. The version of the micro-actuator control signal is notch two filtered to remove at least one second significant excitation resonance to create a notch filtered micro-actuator control signal. The notch filtered micro-actuator control signal stimulates the micro-actuator.

A third embodiment of the invention uses the micro-actuator control path with notch filtering. The version of the micro-actuator control signal is notch two filtered to remove at least one second significant excitation resonance to create a notch filtered micro-actuator control signal. The notch filtered micro-actuator control signal stimulates the micro-actuator.

A fourth embodiment of the invention uses the voice coil motor control path and the micro-actuator control path without notch filtering. Amplifying the voice coil control signal based upon a tuning gain stimulates the voice coil motor. The micro-actuator control signal stimulates the micro-actuator.

A track following command, with the PES removed, directs the micro-actuator control. The voice coil motor control is directed by the track following command, with both the PES and the decoupling feedback signal removed. The PES signal is the additive effect of both the voice coil motor and the micro-actuator to position the magnetic head near the track being followed.

As used herein, a notch filter removes a narrow band from around at least one rejection frequency of the notch filter input signal to generate its output signal. The notch filter removes at least one significant excitation resonance of the servo system from the output of the voice coil motor control. In certain embodiments the significant excitation resonance may be outside the bandwidth of the voice coil control path and/or the micro-actuator control path.

Various embodiments provide the decoupling feedback filter, one or more notch filters and tuning gain to effectively shape the amplitude and phase of at least the voice coil motor control path in the frequency domain. These tools aid in shaping and separating the two control paths, which increases the reliability and performance of the hard disk drives using the invention.

Preferably, the servo-controller digitally supports the elements of the invention. The method of the invention may preferably be implemented to include the program system of the servo-controller residing as program steps in an accessibly coupled memory.

The invention includes optimizing an implementation within the hard disk drive. The optimization may be part of the manufacturing process for the hard disk drive. The invention includes the hard disk drive as the product of that manufacturing process.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

Figure 1A:
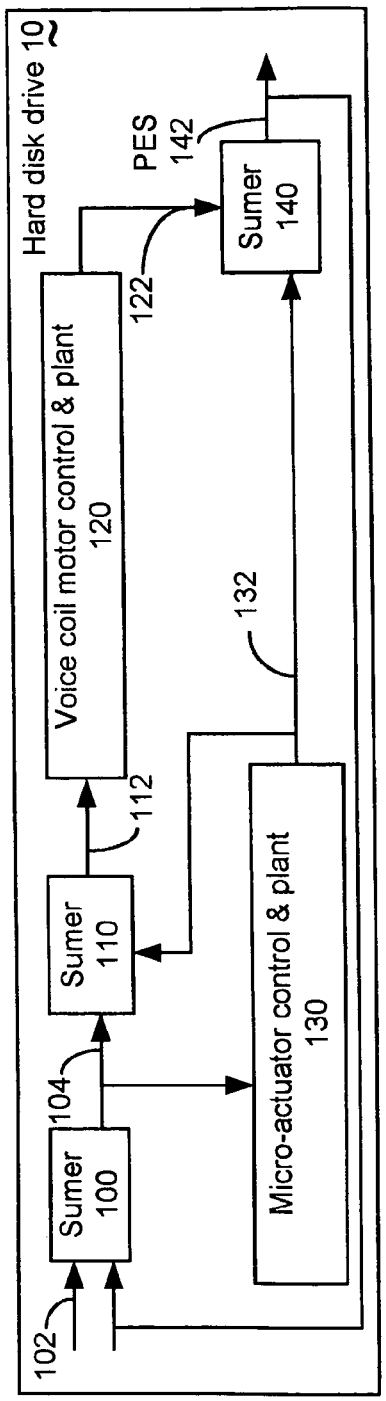
FIG. 1A shows a prior art dual stage servo control system.

FIG. 1A shows a prior art dual stage servo control system for a hard disk drive. The PES signal 142 is removed 100 from the track following command 102 to create the micro-actuator direction 104. The micro-actuator direction 104 stimulates the micro-actuator control signal and plant 130 to create the micro-actuator effect 132. The micro-actuator effect 132 is removed 110 from the micro-actuator direction 104 to create the voice coil motor direction 112. The voice coil motor direction 112 stimulates the voice coil motor control and plant 120 to effect 122 the position of the magnetic head. The magnetic head position is sensed as the Position Error Signal (PES) 142, which is the additive result 140 of the voice coil motor effect 122 and the micro-actuator effect 132.

Each embodiment of the invention operates as two control paths. The micro-actuator control path generates a version of the micro-actuator control signal stimulating the micro-actuator. The voice coil motor control path includes the following. The voice coil motor control generates a version of the voice coil control signal, which is amplified based upon a tuning gain to stimulate the voice coil motor. These control paths are decoupled by a decoupling feedback filter, using the version of the micro-actuator control signal to create the decoupling feedback signal.

FIGS. 1B to 1E show four embodiments of the invention. Each embodiment of the invention operates as two control paths. The micro-actuator control path includes the micro-actuator control 250 generating a micro-actuator control signal 252 based upon a micro-actuator direction 204. A version of the micro-actuator control signal stimulates the micro-actuator 310. The voice coil motor control path includes the following. The voice coil motor control 220 generates a voice coil control signal 222. A version of the voice coil control signal is amplified 240, based upon a tuning gain 244, to create the tuned voice coil control 242. The tuned voice coil control 252 stimulates the voice coil motor 300. These control paths are decoupled by a decoupling feedback filter 260, which uses the version of the micro-actuator control signal to create a decoupling feedback signal 262.

Figure 1B:
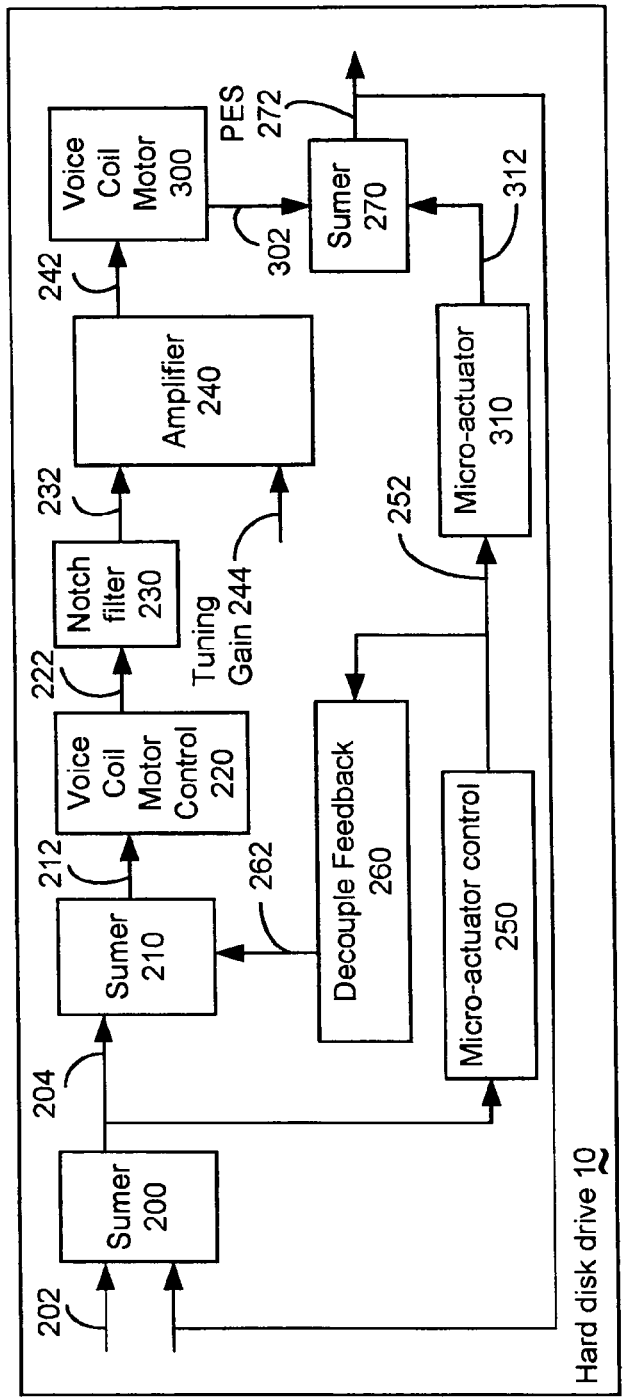
FIG. 1B shows a first embodiment of the invention as a control signal flow within a hard disk drive.

FIG. 1B shows the first embodiment of the invention, which uses the voice coil motor control path with notch filtering. The voice coil control signal 222 is notch one filtered 230 to remove at least one first significant excitation resonance to create a notch filtered voice coil control signal 232, which is the version of the voice coil control signal. Amplifying 240 the notch filtered voice coil control signal 232 is based upon a tuning gain 244, creating the tuned voice coil control 242. The micro-actuator control signal 252 is the version of the micro-actuator control signal, which stimulates the micro-actuator 310.

Figure 1C:
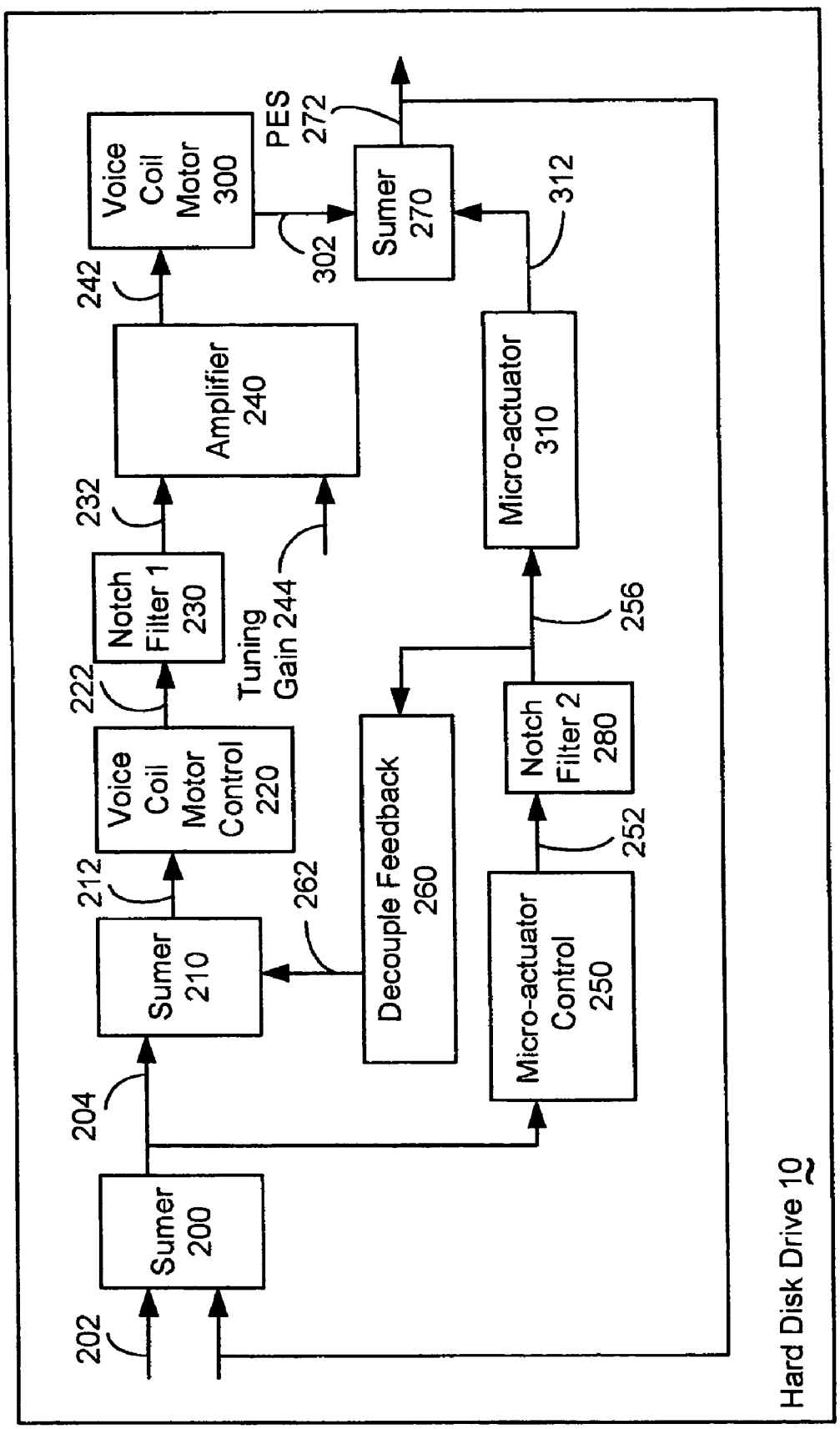
FIG. 1C shows a second embodiment of the invention as a control signal flow within a hard disk drive.

FIG. 1C shows the second embodiment of the invention, which uses the voice coil motor control path and the micro-actuator control path, both with notch filtering. The voice coil control signal 222 is notch one filtered 230 to remove at least one first significant excitation resonance to create a notch filtered voice coil control signal 232, which is the version of the voice coil control signal. Amplifying 240 the notch filtered voice coil control signal 232 is based upon a tuning gain 244, creating the tuned voice coil control 242. The micro-actuator control signal 252 is notch two filtered to remove at least one second significant excitation resonance to create a notch filtered micro-actuator control signal 256. The notch filtered micro-actuator control signal 256 stimulates the micro-actuator 310.

Figure 1D:
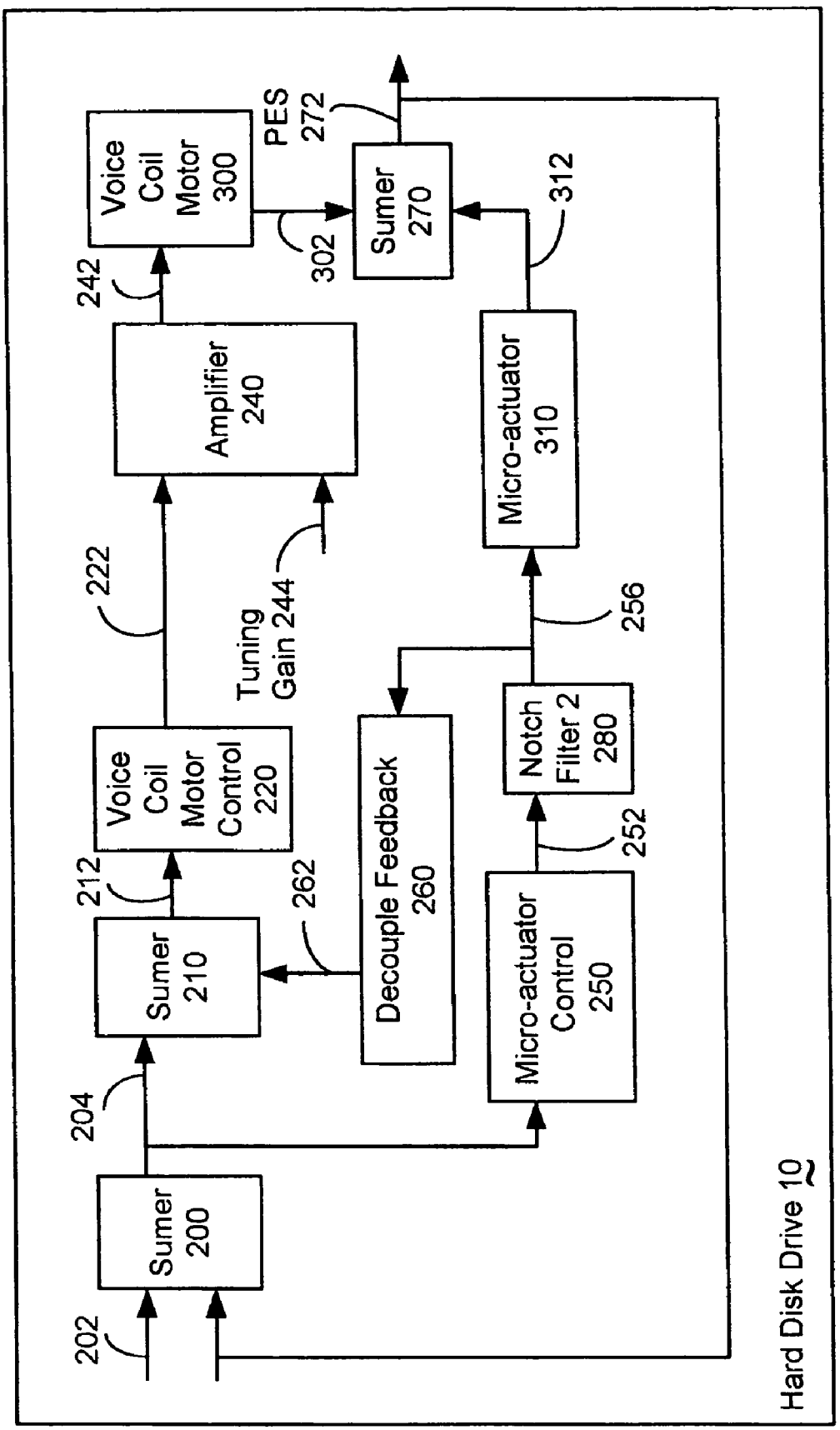
FIG. 1D shows a third embodiment of the invention as a control signal flow within a hard disk drive.

FIG. 1D shows the third embodiment of the invention, which uses the micro-actuator control path with notch filtering. The voice coil control signal 222 is amplified 240, based upon a tuning gain 244, to stimulate 242 the voice coil motor 300. The micro-actuator control signal 252 is notch two filtered to remove at least one second significant excitation resonance to create a notch filtered micro-actuator control signal 256. The notch filtered micro-actuator control signal 256 stimulates the micro-actuator 310.

Figure 1E:
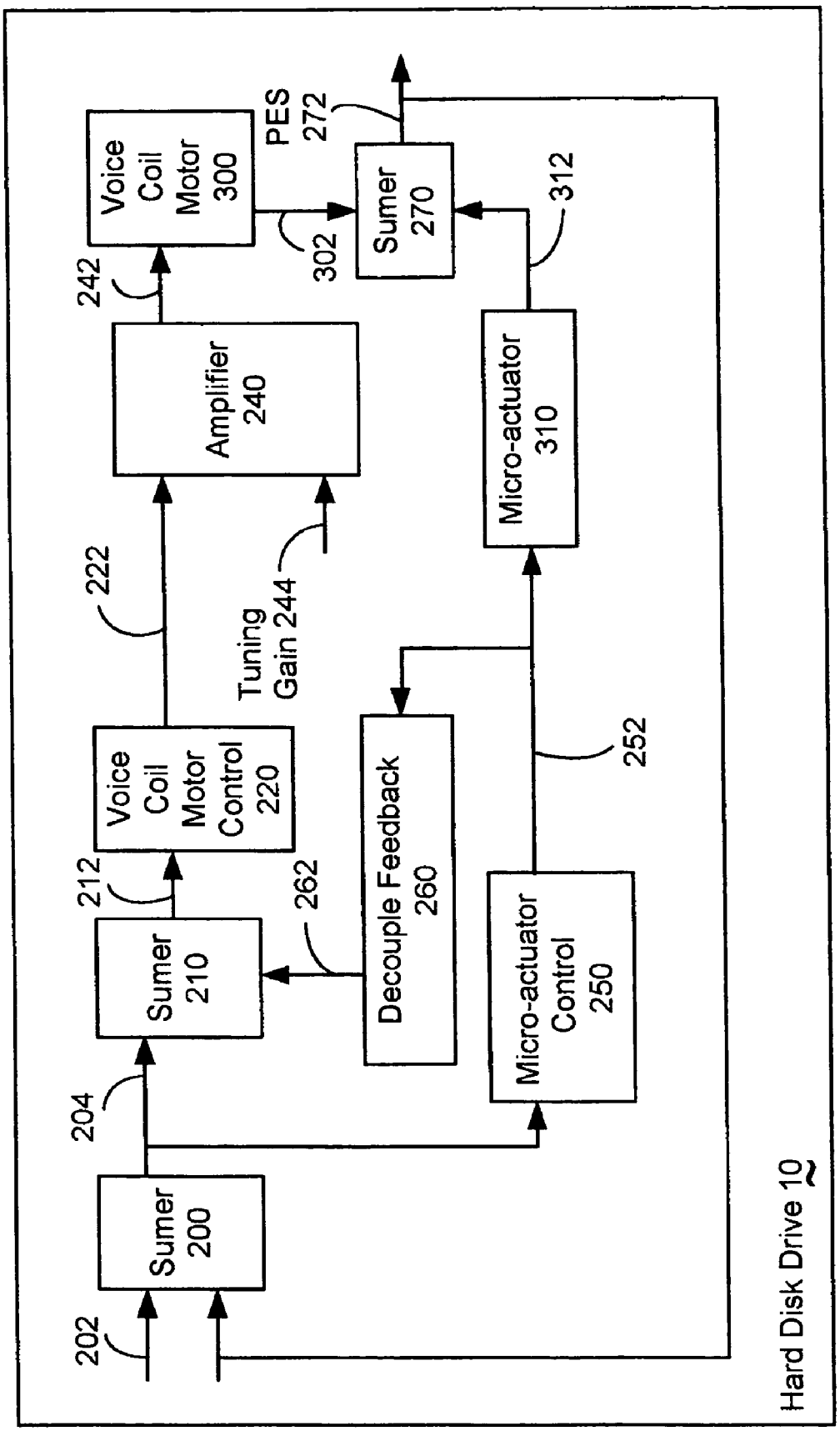
FIG. 1E shows a fourth embodiment of the invention as a control signal flow within a hard disk drive.

FIG. 1E shows the fourth embodiment of the invention uses the voice coil motor control path and the micro-actuator control path without notch filtering. The voice coil control signal 222 is amplified 240, based upon a tuning gain 244, to stimulate 242 the voice coil motor 300. The micro-actuator control signal 252 is the version of the micro-actuator control signal, which stimulates the micro-actuator 310.

FIGS. 1B to 1E show the direction of the micro-actuator control 250 and the voice coil motor control 220. The track following command 202, with the PES 272 removed 200, creates the micro-actuator direction 204, which directs the micro-actuator control 250. The voice coil motor control 220 is directed 212 by the track following command 202, with both the PES 272 and the decoupling feedback signal 262 removed.

FIGS. 1B to 1E show the removal 200 of first the PES 272, followed by the removal 210 of the decoupling feedback signal 262. The invention also includes removal of the decoupling feedback signal 262 followed by the removal of the PES 272 to create an essentially equivalent stimulus 212 of the voice coil motor control 220. The invention also includes the concurrent, essentially simultaneous, removal of both the decoupling feedback signal 262 and the PES 272 to create an essentially equivalent stimulus 212 of the voice coil motor control 220. One skilled in the art will recognize that these alternatives are essentially equivalent and within the scope of the claimed invention.

FIGS. 1B to 1E, and 4A, show the PES 272 as the additive result 270 of the effect 302 of the voice coil motor 300 and the effect 312 of the micro-actuator 310 positioning the magnetic head 500 near the track 18.

As used in FIGS. 1B and 1C, as well as else herein, a notch one filter 230 removes a narrow band from around at least one rejection frequency of the notch filter input signal 222 to generate its output signal 232. The notch one filter 230 removes at least one first significant excitation resonance of the servo system from the output 222 of the voice coil motor control 220. The invention includes the notch one filter removing more than one rejection frequency in certain preferred embodiments.

As used in FIGS. 1C and 1D, as well as elsewhere herein, a notch two filter 280 removes a narrow band from around at least one rejection frequency of the notch filter input signal 252 to generate its output signal 256. The notch two filter 280 removes at least one second significant excitation resonance of the servo system from the output 252 of the micro-actuator control 250. The invention includes the notch two filter removing more than one rejection frequency in certain preferred embodiments.

Various combinations the decoupling feedback filter 260, the notch one filter 230, the notch two filter 280, and the amplifier 240, of FIGS. 1B to 1E, provide the tools to effectively shape the amplitude and phase of at least the voice coil motor control path in the frequency domain. These tools aid in shaping and separating the two control paths, which increase the reliability and performance of the hard disk drive 10. The first embodiment employs the decoupling feedback filter 260, the notch one filter 230, and the amplifier 240, as shown in FIG. 1B. The second embodiment employs the decoupling feedback filter 260, the notch one filter 230, the notch two filter 280, and the amplifier 240, as shown in FIG. 1C. The third embodiment employs the decoupling feedback filter 260, the notch two filter 280, and the amplifier 240, as shown in FIG. 1D. The fourth embodiment employs the decoupling feedback filter 260 and the amplifier 240, as shown in FIG. 1E.

Figure 2:
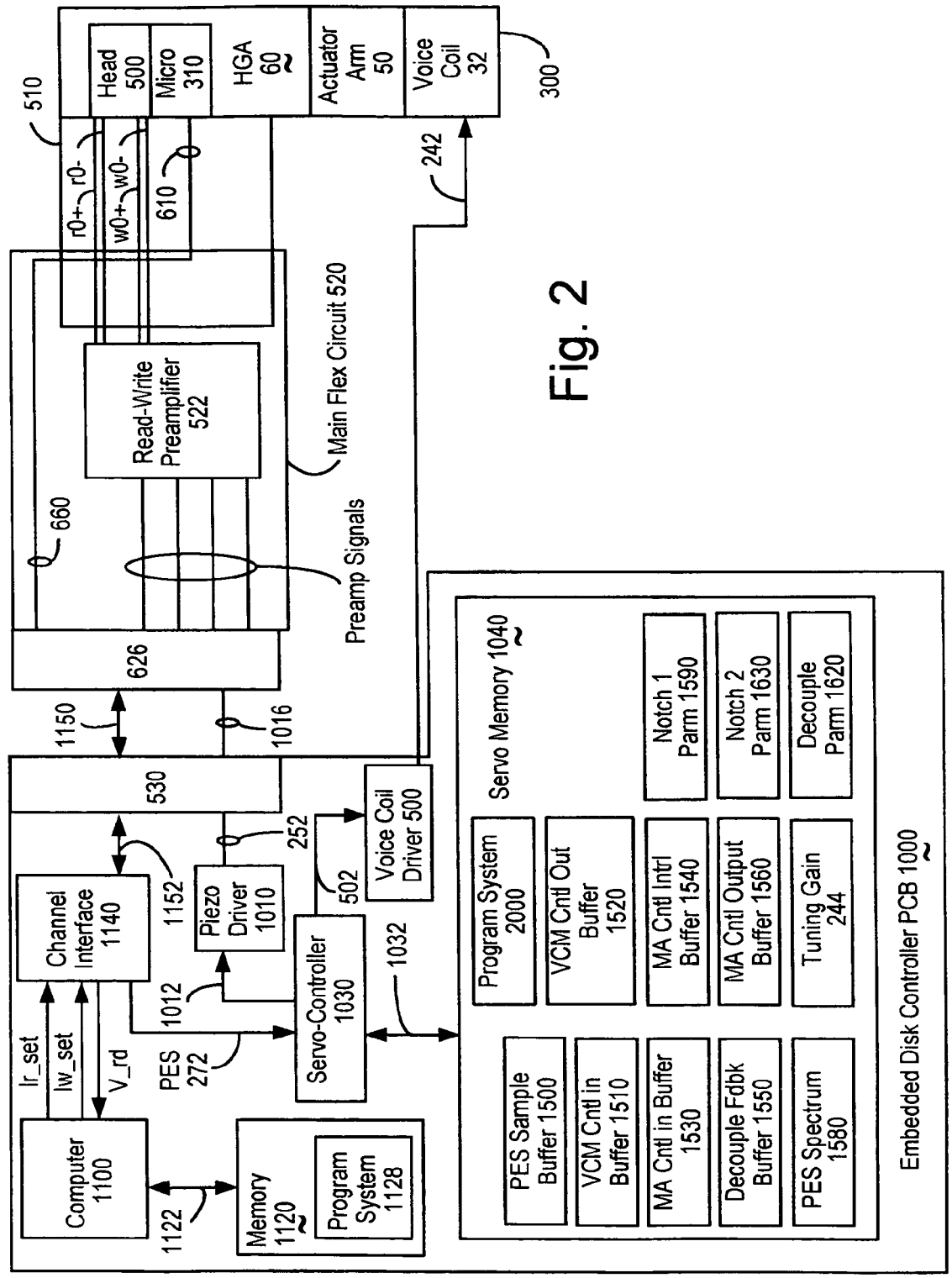
FIG. 2 shows a block diagram implementing the control signal flow of FIGS. 1B to 1E.
Figure 3:
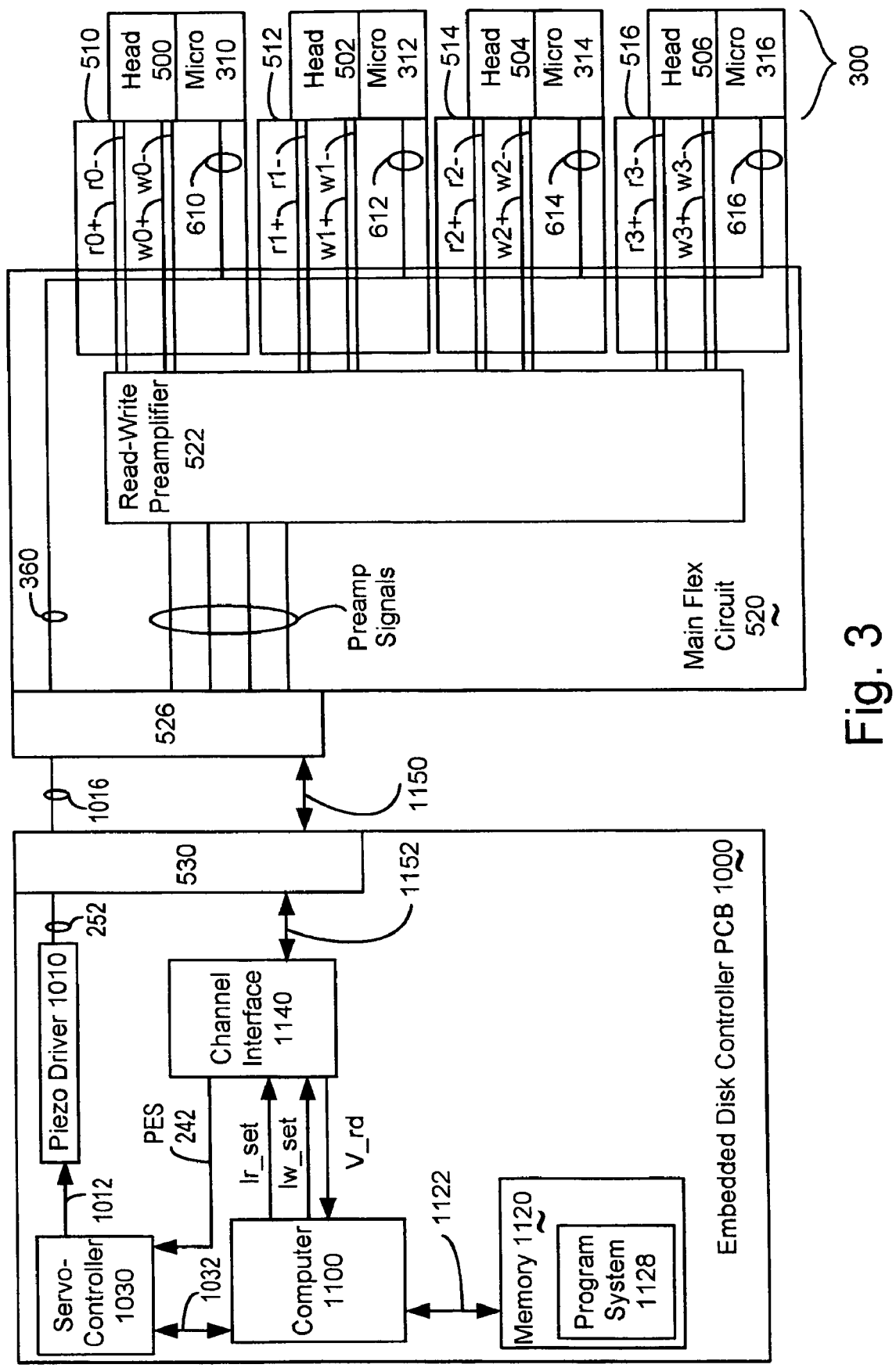
FIG. 3 shows a preferred refinement of FIG. 2 showing the sharing of a micro-actuator stimulus signal among multiple micro-actuators.

FIGS. 1B to 2 show the micro-actuator stimulus 252 provided to one micro-actuator 310. FIG. 3 shows the micro-actuator stimulus 252 provided to multiple micro-actuators, 310-316. FIG. 3 shows a further preferred embodiment, providing the micro-actuator stimulus 252 in parallel to each of the micro-actuators 310-316. FIGS. 2 and 3 show a single wire approach to stimulating the micro-actuator(s). In certain, sometimes preferred, circumstances, the micro-actuators may include a second lead presented a common signal, often ground. In certain other circumstances, the micro-actuators may be stimulated 252 by a two wire signal.

In many circumstances, the micro-actuators may preferably include at least one piezoelectric device. However, one skilled in the art will recognize that at least one of the micro-actuators may include an electrostatic device and/or an electromagnetic device. While these alternatives are potentially viable and of use, the remainder of this discussion will focus on piezoelectric based micro-actuators. This is to simplify the discussion, and is not meant to limit the scope of the claims for this invention.

FIG. 2 shows a block diagram implementing the control signal flow in the hard disk drive 10 of FIG. 1B. The embedded disk controller Printed Circuit Board (PCB) 100 uses a program system 3000, a collection of buffers 1600-1580, and parameters 1590-1630, interacting through the servo-controller 1030. These components act together. The voice coil driver 500 simulates 244 the voice coil 32 of the voice coil motor 300. At least one piezo driver 1010 stimulates 252 at least one micro-actuator 310 to position a magnetic head 500.

The buffers 1600-1580 of FIG. 2 may be used by the relevant operations of the invention to store one or more items. Examples may include input buffers such as the PES sample buffer 1600, the voice coil motor control input buffer 1610, and the micro-actuator control signal input buffer 1614. Example output buffers may include the voice coil motor control output buffer 1612 and the micro-actuator control signal output buffer 1618. There may be buffers which act to store intermediate values, such as the micro-actuator intermediate buffer 1616. There may also be buffers which act to store both input and output buffers, such as the decoupling feedback buffer 1550.

Figure 4A:
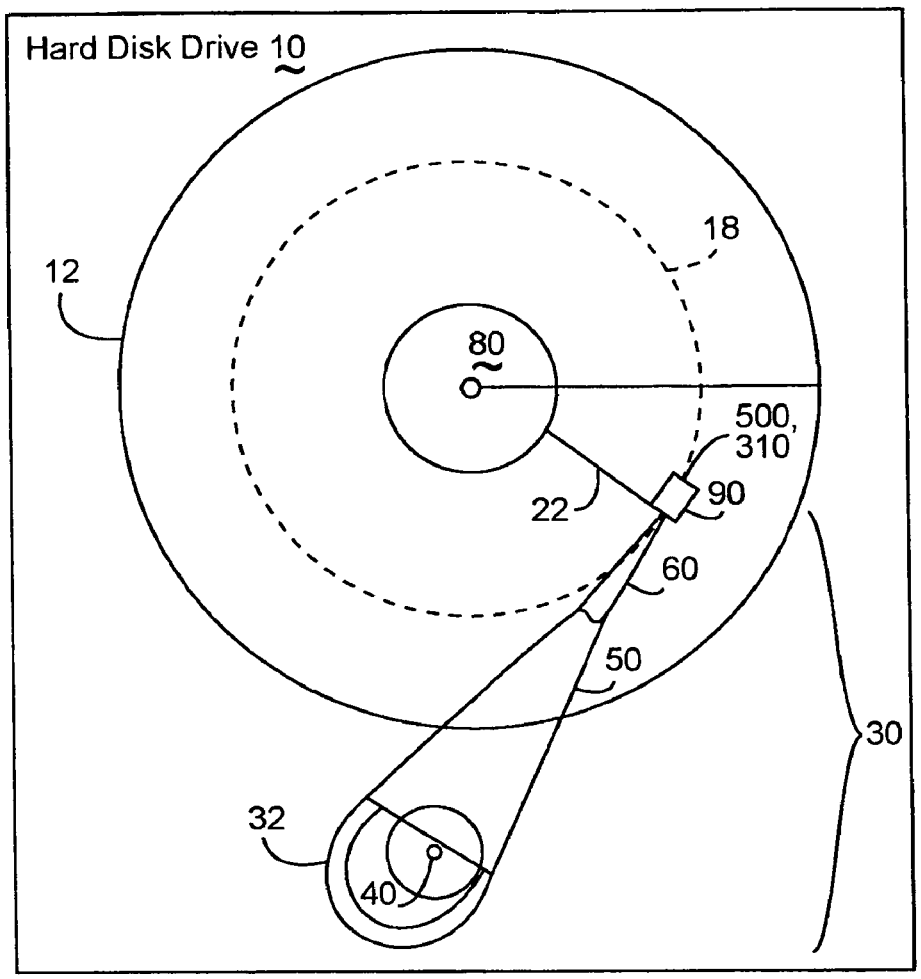
FIG. 4A shows the relationship between of the voice coil motor and actuator assembly traversing a rotating disk surface while following a track.
Figure 5:
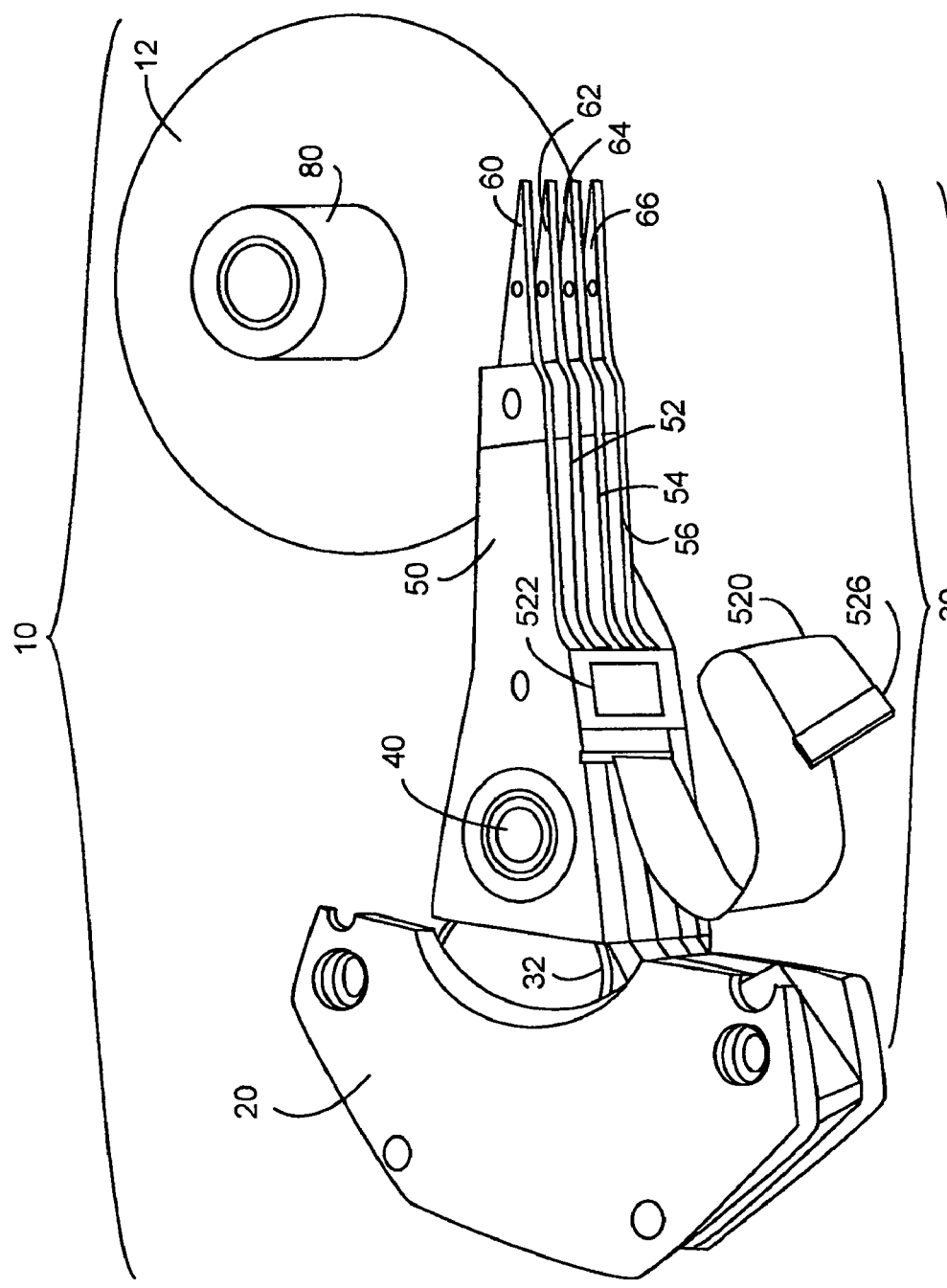
FIG. 5 shows a simplified diagram of the voice coil motor and actuator assembly of a hard disk drive as in FIGS. 1B to 4A.

FIG. 4A shows the actuator assembly 30 following a track 18 of a rotating disk surface 12 in a hard disk drive 10. FIG. 5 shows further details of the voice coil motor 300 and an alternative actuator assembly 30. The actuator assembly 30 of FIG. 4A shows one actuator arm 50, whereas the alternative actuator assembly 30 of FIG. 5 shows multiple actuator arms 50-56.

The actuator assembly 30 of FIGS. 4A and 5, includes actuator arms 50-56 coupled with voice coil 32.

By way of example, FIGS. 4A shows an actuator arm 50 coupled with at least one Head Gimbal Assembly (HGA) 60. Each HGA 60 couples with at least one slider 90. Embedded in each slider 90 is a magnetic head 500, which is positioned to follow a track 18 at a very small distance above the rotating disk surface 12.

In FIG. 5, the actuator assembly 30 includes each the actuator arms 50-56 coupled with at least one HGA 60-66. Each of the HGAs 60-66 are coupled with at least one slider (not shown in FIG. 5).

The voice coil motor 300 in FIG. 5 includes the actuator assembly 30 and the fixed magnet 20. Stimulating 242 the voice coil motor 300 in FIG. 1B further involves stimulating 242 the voice coil 32 in FIG. 2. The effect 302 of the voice coil motor 300 includes the interaction of the fixed magnet 20 with the voice coil 32. The coupling of the voice coil with the actuator arm 50, and its coupling with the HGA 60, moves the slider 90, with its embedded magnetic head 500, by a lever action. The lever action pivots the actuator assembly 30 by the actuator axis 40 as shown in FIG. 4A.

There are two mechanisms acting to position the magnetic head 500 close to the track 18 in FIGS. 4A and 5. The voice coil motor 300 includes the voice coil 32 interacting with a fixed magnet 20. The interaction of the voice coil 32 pivots actuator assembly 30 through actuator axis 40. Additionally, the micro-actuator 310 interacts with the HGA 60 and the slider 90 to position the magnetic head 500.

The method of controlling the magnetic head 500 of FIG. 2 is shown as a flowchart in FIG. 6 of program steps of the program system 3000.

Preferably, the servo-controller 1030 of FIGS. 2 and 3, digitally provides at least some of the elements of the invention. Preferably, the implementation of the method includes the program system 3000 of the servo-controller 1030 residing as the program steps of FIGS. 6 to 7C in a servo memory 1040 accessibly coupled 1032 with the servo-controller 1030. The servo memory 1040 may include any combination of volatile and non-volatile memory. As used herein, volatile memory requires a power supply to maintain its memory states, whereas a non-volatile memory has at least one memory state which persists without a power supply.

Some of the following figures show flowcharts of at least one method of the invention, possessing arrows with reference numbers. These arrows will signify of flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element. By way of example, a computer may include a general purpose computer and a Digital Signal Processor (DSP). The DSP may directly implement fixed point and/or floating point arithmetic.

Figure 4B:
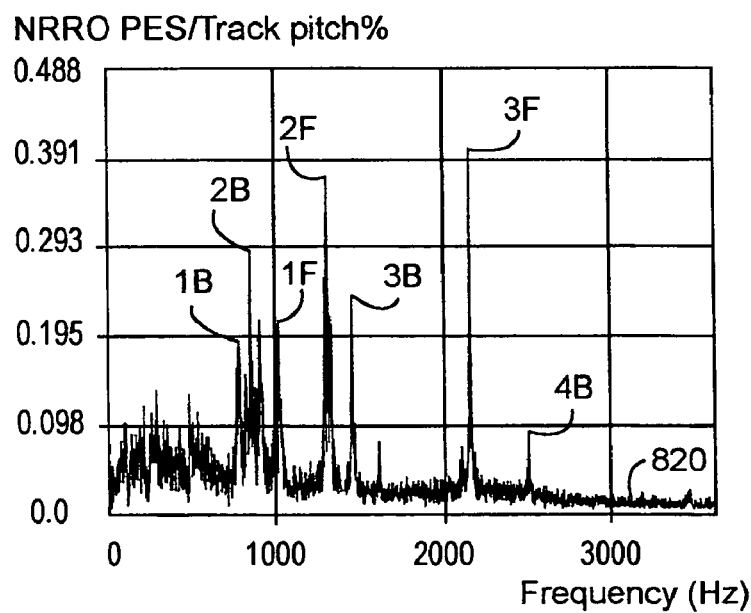
FIG. 4B shows a typical spectrum for a contemporary hard disk drive with several significant excitation resonances.

FIG. 4B shows a typical Non-Repeatable Run-Out (NRRO) spectrum of the PES signal for a contemporary hard disk drive with several significant excitation resonances. These significant resonances are labeled 1B, 1F, 2B, 2F, 3B, 3F, 4B, and 4F. These resonances are significant because of their affect on the PES signal, which is shown in terms of a percentage fraction of the track pitch, also known herein as track width.

FIG. 4B shows a common form of significant excitation resonance, often occurring when the disk surface bends up or down. Bending is defined in terms of bending modes. For a positive integer k, a bending mode of (k,0) produces k nodal lines running through the disk surface center, creating k peaks and k troughs arranged on the disk surface. Bending mode (0,0) produces no nodal lines, either the entire disk is bent up or bent down.

In FIG. 4B, reference labels 1B and 1F represent the backward frequency and the forward frequency associated with bending mode (1,0). Reference labels 2B and 2F represent the backward frequency and the forward frequency associated with bending mode (2,0). Reference labels 3B and 3F represent the backward frequency and the forward frequency associated with bending mode (3,0).

In a typical contemporary disk drive lacking a micro-actuator, the bandwidth of the servo system is often in the range of 1 KHz to 1.1 KHz. In a hard disk drive employing micro-actuators, the bandwidth of the servo system has been reported in excess of 1.8 KHz.

The micro-actuator stimulus 252 may preferably, be concurrently provided to more than one micro-actuator, as shown in FIG. 3. The micro-actuators 310-316 may further preferably be concurrently stimulated in parallel, as shown.

Figure 6A:
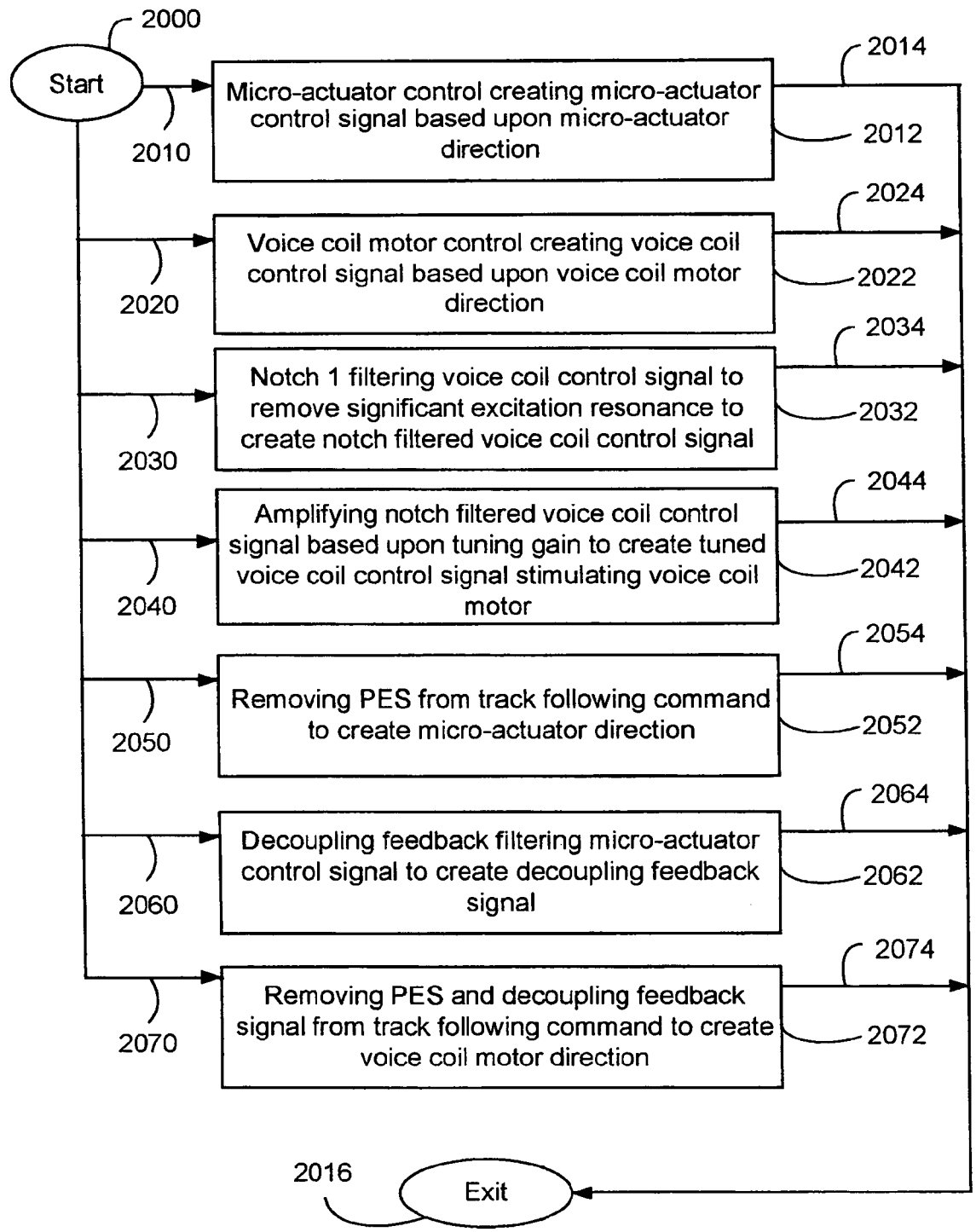
FIG. 6A shows implementing the method operating the first embodiment of FIG. 1B as the program system of FIG. 2.

FIG. 6A shows a flowchart of program system 3000 of FIG. 2 implementing the first embodiment for controlling a voice coil motor 300 and at least one micro-actuator 310 of FIGS. 1-4A and 5. The first embodiment of the invention is shown as two control paths in FIG. 1B. The first embodiment of the invention uses the voice coil motor control path with notch filtering. The version of the voice coil control signal is notch one filtered to remove at least one significant excitation resonance to create a notch filtered voice coil control signal. Amplifying the notch filtered voice coil control signal based upon a tuning gain stimulates the voice coil motor.

Figure 6B:
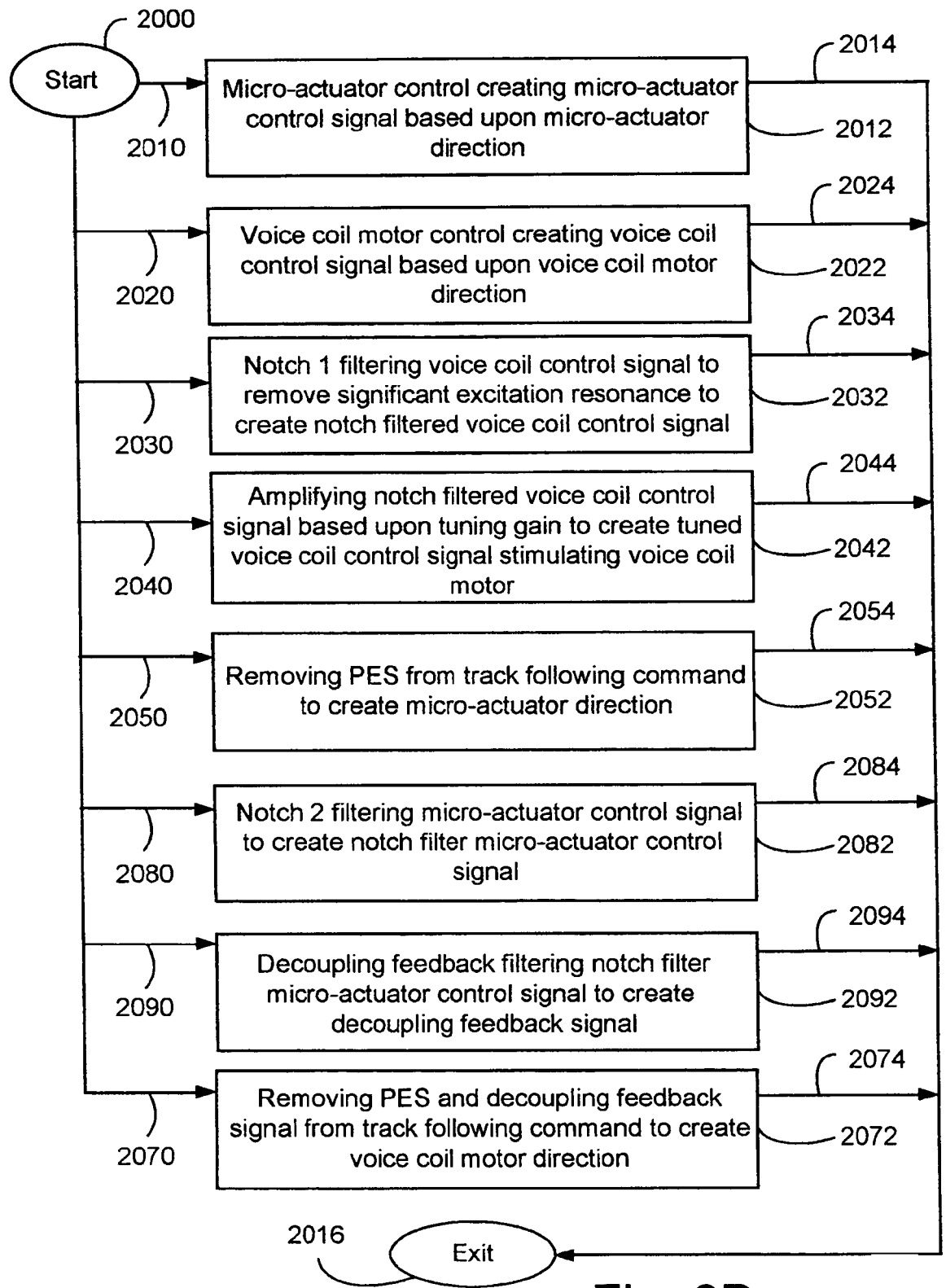
FIG. 6B shows implementing the method operating the first embodiment of FIG. 1C as the program system of FIG. 2.

FIG. 6B shows a flowchart of program system 3000 of FIG. 2 implementing the second embodiment for controlling a voice coil motor 300 and at least one micro-actuator 310 of FIGS. 1-4A and 5. The second embodiment of the invention is shown as two control paths in FIG. 1C. A second embodiment of the invention uses the voice coil motor control path and the micro-actuator control path with notch filtering. The version of the voice coil control signal is notch one filtered to remove at least one first significant excitation resonance to create a notch filtered voice coil control signal. Amplifying the notch filtered voice coil control signal based upon a tuning gain stimulates the voice coil motor. The version of the micro-actuator control signal is notch two filtered to remove at least one second significant excitation resonance to create a notch filtered micro-actuator control signal. The notch filtered micro-actuator control signal stimulates the micro-actuator.

Figure 6C:
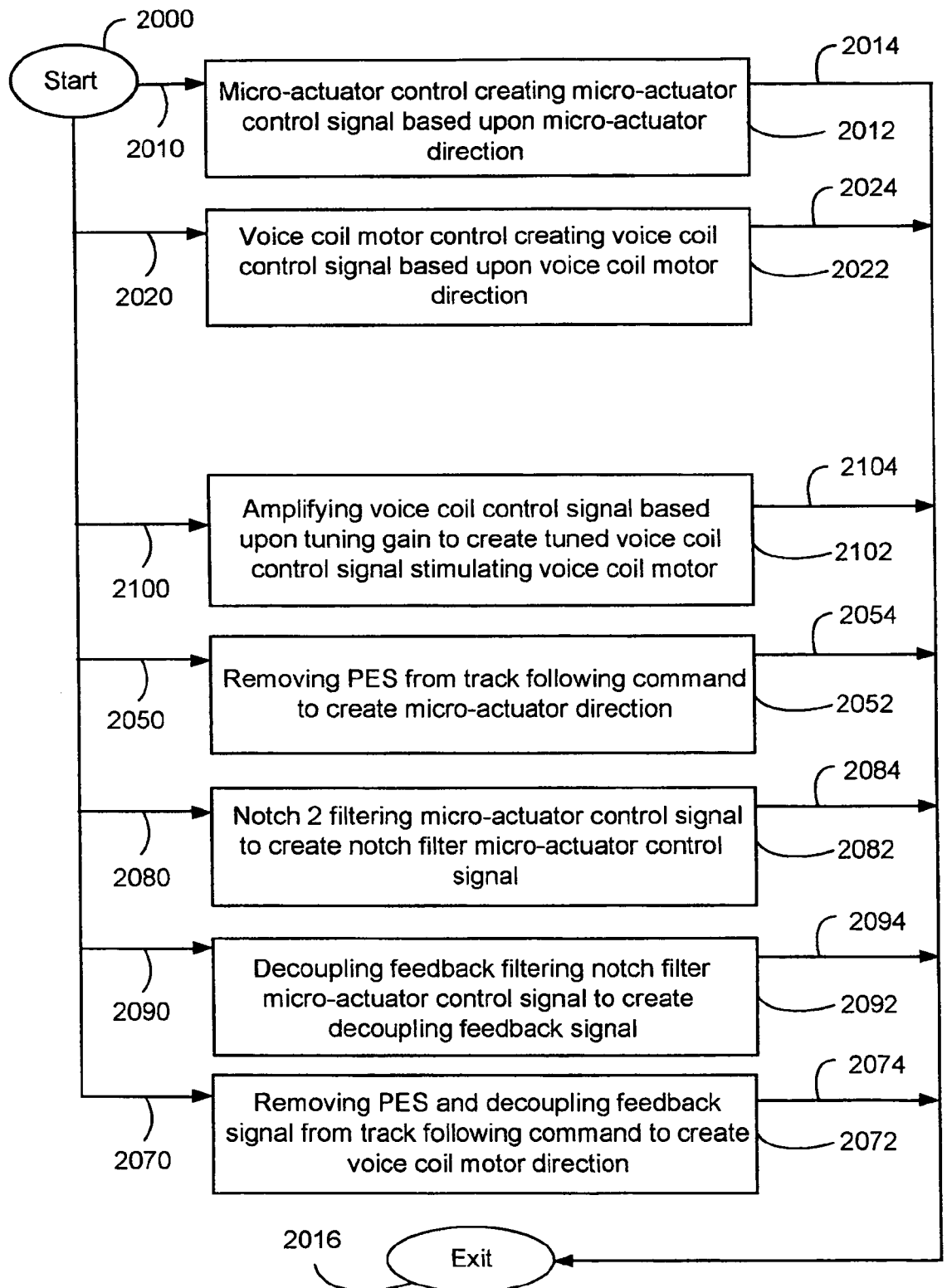
FIG. 6C shows implementing the method operating the first embodiment of FIG. 1D as the program system of FIG. 2.

FIG. 6C shows a flowchart of program system 3000 of FIG. 2 implementing the third embodiment for controlling a voice coil motor 300 and at least one micro-actuator 310 of FIGS. 1-4A and 5. The third embodiment of the invention is shown as two control paths in FIG. 1C. A third embodiment of the invention uses the micro-actuator control path with notch filtering. The version of the micro-actuator control signal is notch two filtered to remove at least one second significant excitation resonance to create a notch filtered micro-actuator control signal. The notch filtered micro-actuator control signal stimulates the micro-actuator.

Figure 6D:
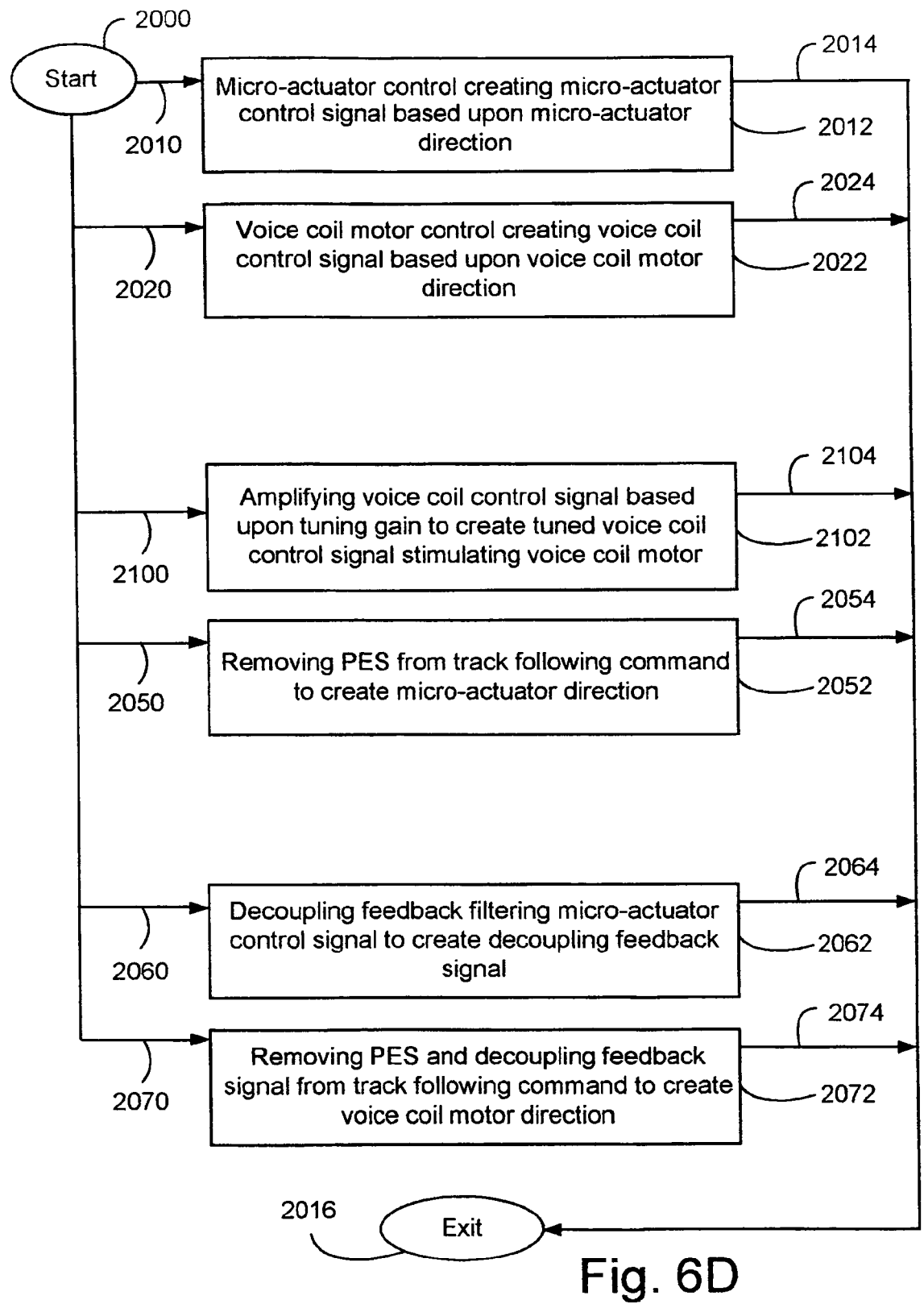
FIG. 6D shows implementing the method operating the first embodiment of FIG. 1E as the program system of FIG. 2.

FIG. 6D shows a flowchart of program system 3000 of FIG. 2 implementing the foruth embodiment for controlling a voice coil motor 300 and at least one micro-actuator 310 of FIGS. 1-4A and 5. The fourth embodiment of the invention is shown as two control paths in FIG. 1E. A fourth embodiment of the invention uses the voice coil motor control path and the micro-actuator control path without notch filtering. Amplifying the voice coil control signal based upon a tuning gain stimulates the voice coil motor. The micro-actuator control signal stimulates the micro-actuator.

In FIGS. 6A to 6D, operation 2012 supports a micro-actuator control 250, of FIGS. 1B to 1E, creating a micro-actuator control signal 252 based upon a micro-actuator direction 204. The micro-actuator 310 creates the first 312 of the two effects resulting 270 in the magnetic head 500 following the track 18 of FIG. 4A.

In FIGS. 6A to 6D, operation 2022 supports a voice coil motor control 220, of FIGS. 1B to 1E, creating a voice coil control signal 222 based upon a voice coil motor direction 212.

In FIGS. 6A and 6B, operation 2032 supports the notch one filter 230, of FIG. 1B. The notch one filter 230 uses the voice coil control signal 222 to create a notch filtered voice coil control signal 232. Operation 2032 supports removing at least one first significant excitation resonance in creating the notch filtered voice coil control signal 232. Examples of the significant excitation resonances are labeled 1B-3F in FIG. 4B.

In FIGS. 6A and 6B, operation 2042 supports the amplifying 240, of FIGS. 1B and 1C. The notch filtered voice coil control signal 232 is amplified 240, based upon a tuning gain 244, to create a tuned voice coil control signal 242.

In FIGS. 6C and 6D, operation 2102 supports the amplifying 240, of FIGS. 1D and 1E. The voice coil control signal 224 is amplified 240, based upon a tuning gain 244, to create a tuned voice coil control signal 242.

In FIGS. 1B to 2, the tuned voice coil control signal 242 stimulates the voice coil motor 300. FIG. 2 further shows the tuned voice coil control signal 242 stimulating the voice coil 32. The voice coil motor 300, based upon stimulus 242 of the voice coil 32, creates the second 300 of the two effects resulting 270 in the magnetic head 500 following the track 18 of FIG. 4A.

In FIGS. 6A to 6D, operation 2052 supports removing 200 the PES 272 from a track following command 202 to create the micro-actuator direction 204, as shown in FIGS. 1B to 1E.

In FIGS. 6A and 6D, operation 2062 supports decoupling feedback filtering 260 the micro-actuator control signal 252 to create a decoupling feedback signal 262, as shown in FIGS. 1B and 1E.

In FIGS. 6B and 6C, operation 2082 supports notch two filtering 280 the micro-actuator control signal 252 to create the notch filtered micro-actuator control signal 256, as shown in FIGS. 1C and 1D. Operation 2082 preferably supports removing at least one second significant excitation resonance in creating the notch filtered micro-actuator control signal 256. Examples of the significant excitation resonances are labeled 1B-3F in FIG. 4B.

In FIGS. 6B and 6C, operation 2092 supports decoupling feedback filtering 260 the notch filtered micro-actuator control signal 256 to create a decoupling feedback signal 262, as shown in FIGS. 1C and 1D.

In FIGS. 6A to 6D, operation 2072 supports removing 200 the PES 272 and removing 210 the decoupling feedback signal 262 from the track following command 202 to create the voice coil motor direction 212, as shown in FIGS. 1B to 1E.

Figure 7A:
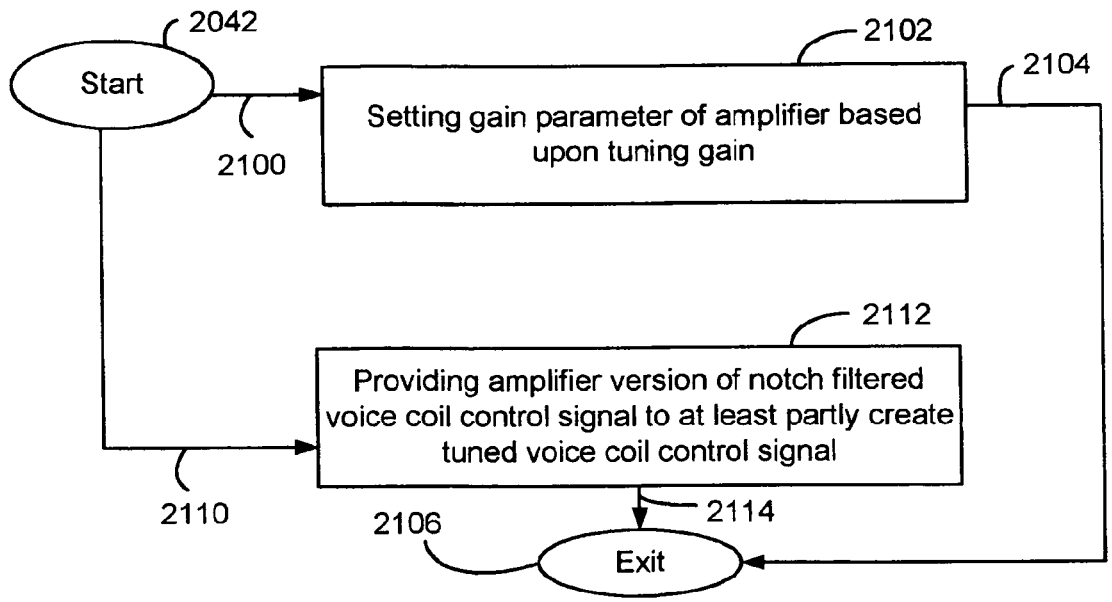
FIG. 7A shows a detail flowchart of FIGS. 6A and 6B supporting the amplifying of FIGS. 1B and 1C.

FIG. 7A shows a detail flowchart of operation 2042 of FIGS. 6A and 6B, supporting amplifying 240 the notch filtered voice coil control signal 232 based upon the tuning gain 244, as shown in FIG. 1B and 1C.

Figure 9A:
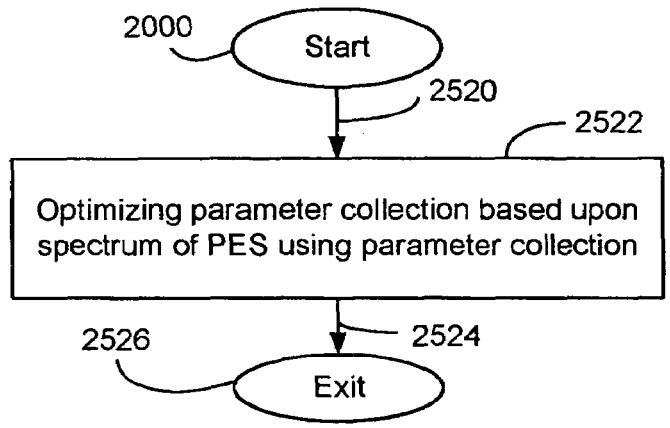
FIG. 9A shows a flowchart extending the method to optimize the parameter collection of FIG. 9B.
Figure 9C:
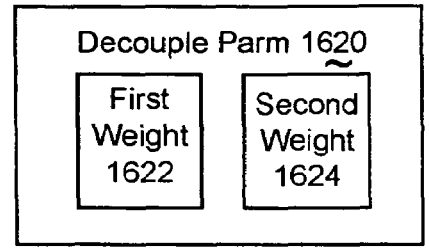
FIG. 9C shows details of an embodiment of the decoupling filter parameters of FIG. 2.
Figure 9B:
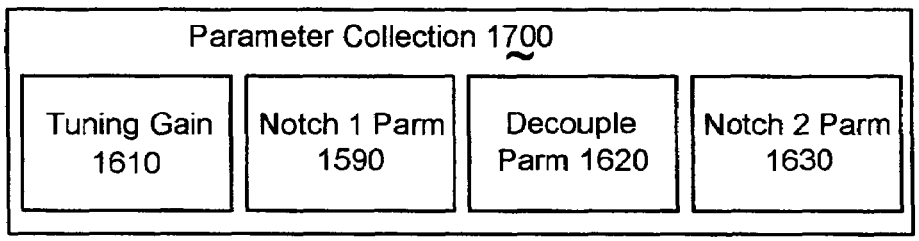
FIG. 9D shows details of an embodiment of the voice coil driver of FIG. 2.
FIG. 9E shows details of an embodiment of the decoupling feedback buffer of FIG. 2.
FIG. 9F shows details of an embodiment of the first notch filter parameter collection of FIG. 2.
Figure 9D:
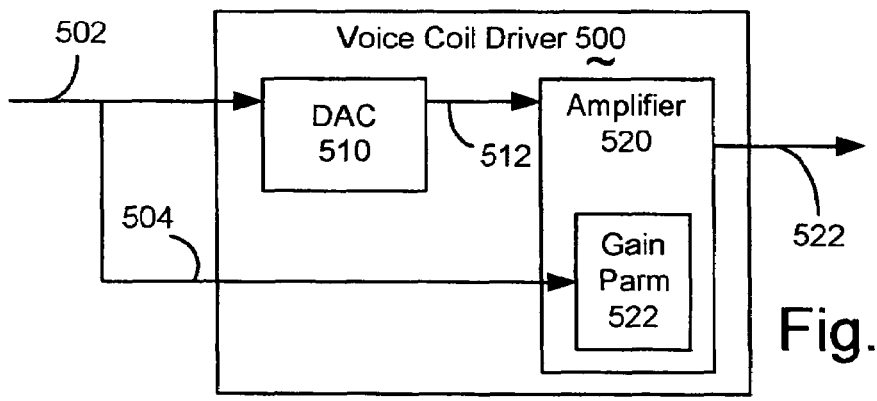

In FIG. 7A, operation 2102 supports setting a gain parameter 522, shown in FIG. 9D, of an amplifier 520, based upon the tuning gain 244, shown in FIGS. 1B, 1C, and 2. Operation 2112 supports providing the amplifier 520 a version 512 of the notch filtered voice coil control signal 232 to at least partly create the tuned voice coil control signal 522.

Figure 7B:
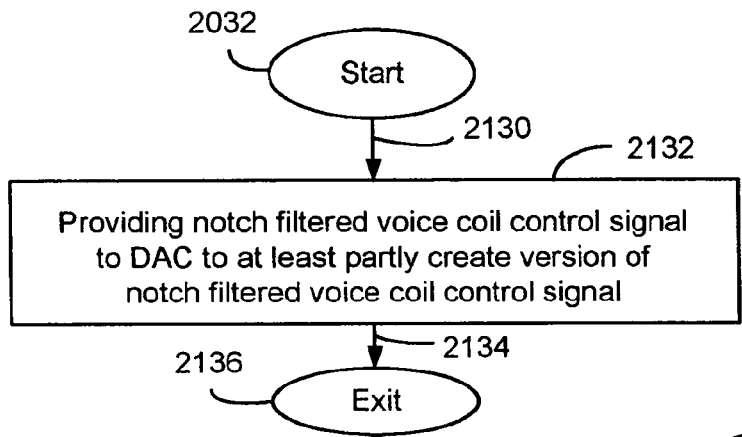
FIG. 7B shows a detail flowchart of FIGS. 6A and 6B supporting the notch one filtering of FIGS. 1B and 1C.

FIG. 7B shows a detail flowchart of operation 2032 of FIG. 6A and 6B supporting the notch one filtering 230 of FIGS. 1B and 1C.

Figure 7C:
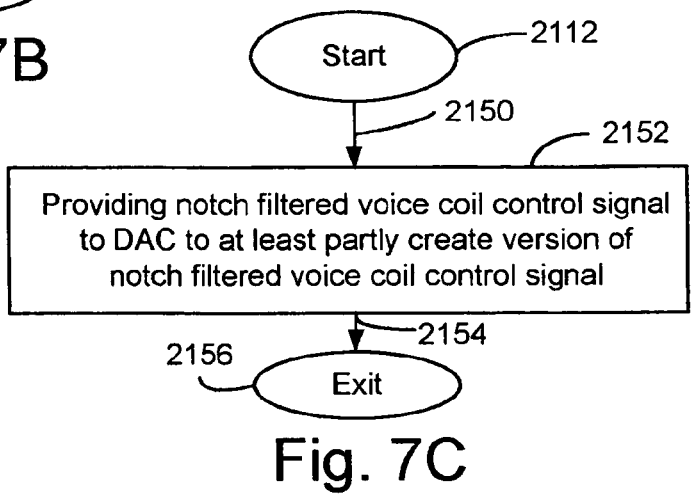
FIG. 7C shows a detail flowchart of FIG. 7A providing a version of the notch filtered voice coil control signal of FIGS. 1B, 1C and 9D.

FIG. 7C shows a detail flowchart of operation 2112 of FIG. 7A providing the version 512 of FIG. 9D of the notch filtered voice coil control signal 232 of FIGS. 1B and 1C.

In FIG. 7B, operation 2132 supports providing the notch filtered voice coil control signal 232 to a Digital to Analog Converter (DAC) 510. The output of the DAC 510 at least partly creates the version 512 of the notch filtered voice coil control signal 232 shown in FIGS. 1B and 1C.

In FIG. 7C, operation 2152 supports providing the notch filtered voice coil control signal 232 to the DAC 510 to at least partly create the version 512 of the notch filtered voice coil control signal 232.

FIGS. 7B and 7C show essentially comparable operations, performed as part of two separate operations 2032 and 2042, within the method 3000. The invention includes both approaches, as well as alternative scheduling of the operations of FIG. 6A and 6B.

FIG. 9B shows the DAC 510 included in the voice coil driver 500 of FIG. 2. One skilled in the art will recognize that the communication 502 with the voice coil driver 500 may include communication integrated into one communication protocol as shown, or may include multiple communication protocols. Such multiple protocols may support separated data communication to a DAC 510 and an amplifier 520, as well as communication for setting 504 parameters within a voice coil driver 500. One skilled in the art will also recognize that the DAC output 512 may be further conditioned by a filter, often a RC network, coupled to remove quantization noise.

Figure 8A:
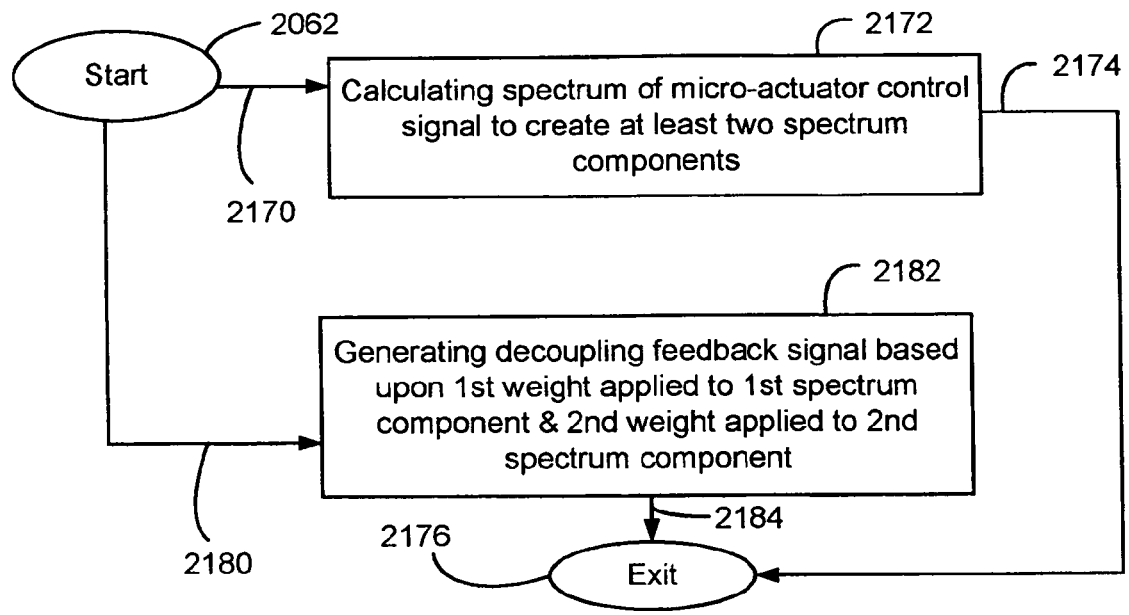
FIG. 8A shows a detail flowchart of FIGS. 6A and 6D further performing the decoupling feedback filtering of FIGS. 1B and 1E.
Figure 9E:
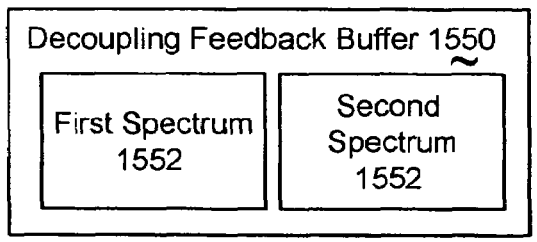

FIG. 8A shows a detail flowchart of operation 2062 of FIGS. 6A and 6D further performing the decoupling feedback filtering 260 of FIGS. 1B and 1E. Operation 2172 supports calculating a spectrum of the micro-actuator control signal 252 to create at least two spectrum components 1552 and 1554, as shown in FIG. 9E. These spectrum components 1552 and 1554 are preferably contained in the decoupling feedback buffer 1550, residing in the servo memory 1040 as shown in FIG. 2. Operation 2182 generates the decoupling feedback signal 262 of FIGS. 1B and 1E based upon a first weight 1622 of FIG. 9C applied to the first spectrum component 1552 and a second weight 1624 applied to the second spectrum component 1554. Typically, applying a weight to a spectrum component involves approximating the multiplication of the weight by the spectrum component. The decoupling feedback signal 262 is typically formed from the sum of these applications.

Figure 8B:
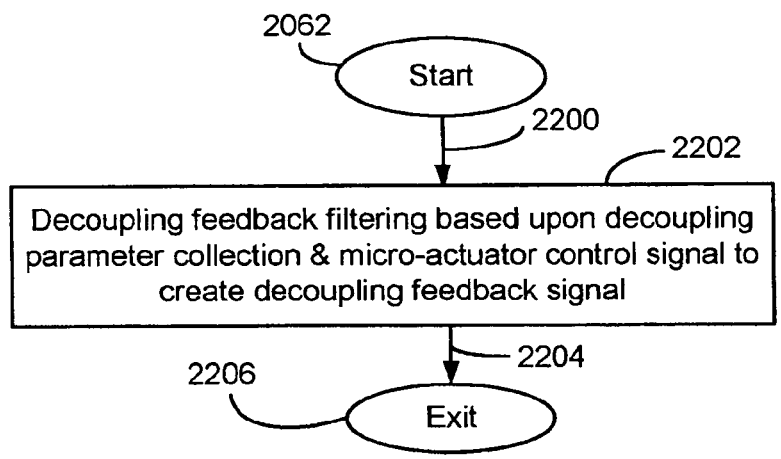
FIG. 8B shows a detail flowchart of FIG. 6A and 6D further supporting the decoupling feedback filter of FIGS. 1B, 1E, 6A, 6D, and 8A.

FIG. 8B shows a detail flowchart of operation 2062 of FIG. 6A and 6D further supporting the decoupling feedback filter 260 of FIGS. 1B, 1E, 6A, 6D, and 8A. Operation 2202 supports decoupling feedback filtering 260, based upon a decoupling parameter collection 1620 of FIG. 2. The decoupling feedback filter 260 receives the micro-actuator control signal 252 to create a decoupling feedback signal 262.

Figure 8C:
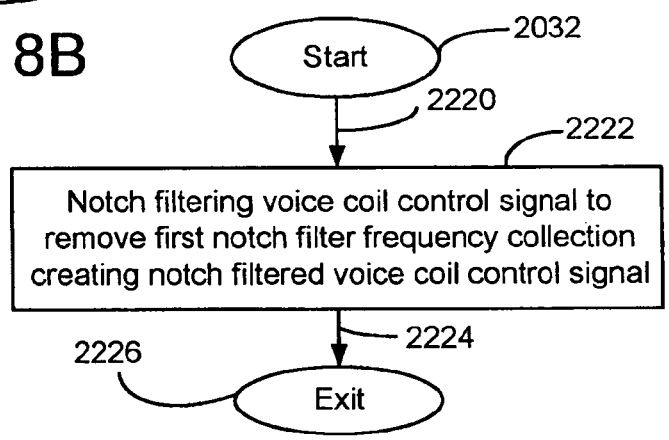
FIG. 8C shows a detail flowchart of FIG. 6A and 6B further supporting the notch one filtering of FIGS. 1B and 1C.

FIG. 8C shows a detail flowchart of operation 2032 of FIG. 6A and 6B further supporting the notch one filtering 230 of FIGS. 1B and 1C. Operation 2222 supports the notch one filtering 230, removing a first notch filter frequency collection 1592 from the voice coil control signal 222 of FIGS. 1B and 1C to create the notch filtered voice coil control signal 232. The first notch filter frequency collection 1592 is shown in FIG. 9F.

Figure 9F:
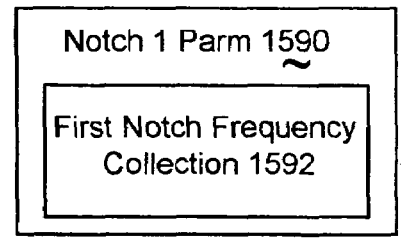

Preferably, the first notch filter frequency collection 1592 is contained in the first notch filter parameters 1590 as shown in FIG. 9F. Preferably, the first notch filter parameters 1590 reside in servo memory 1040 as shown in FIG. 2. It may be preferred that the first notch filter frequency collection 1592 include more than one member.

It may be preferred that each of the first notch filter collection 1592 members of FIGS. 8C and 9F approximate one of the significant excitation resonances 1B-3F as shown in FIG. 4B. It may further be preferred that at least one of the notch filter frequency collection 1592 members be outside the servo bandwidth of the voice coil motor control path of FIG. 1B. It may be further preferred that all the first notch filter frequency collection members be outside the servo bandwidth of the voice coil motor control path. It may be further preferred that the first notch filter frequency collection members be within the bandwidth of the micro-actuator control signal path, to minimize interference between the two control paths.

FIG. 9A shows the method of the invention 3000 of FIG. 2 and 6A to 6D, optimizing the implementation within the hard disk drive 10 of FIGS. 1 B to 4A.

In FIG. 9A, operation 2252 optimizes a parameter collection 1700, shown in FIG. 9B, based upon a spectrum of the PES 272, as shown in FIG. 4B, resulting from using the parameter collection 1700.

The parameter collection 1700 of FIG. 9B includes various combinations of the tuning gain 244, the first notch filter parameter collection 1590, the second notch filter collection 1630, and the decoupling filter parameter collection 1620. The tuning gain 244 is shown in FIGS. 1B and 2. The first notch filter parameter collection 1590 is shown in FIGS. 2 and 9F. The decoupling filter parameter collection 1620 is shown in FIGS. 2 and 9C. The second notch filter collection is shown in FIGS. 2 and 10D.

The first embodiment of the invention shown in FIGS. 1B and 6A uses the parameter collection 1700 including the tuning gain 244, the first notch filter parameter collection 1590, and the decoupling filter parameter collection 1620.

The second embodiment of the invention shown in FIGS. 1C and 6B uses the parameter collection 1700 including the tuning gain 244, the first notch filter parameter collection 1590, the second notch filter collection 1630, and the decoupling filter parameter collection 1620.

The third embodiment of the invention shown in FIGS. 1D and 6C uses the parameter collection 1700 including the tuning gain 244, the second notch filter collection 1630, and the decoupling filter parameter collection 1620.

The fourth embodiment of the invention shown in FIGS. 1E and 6D uses the parameter collection 1700 including the tuning gain 244 and the decoupling filter parameter collection 1620.

By way of example, the optimizing operation 2252 of FIG. 9A may include, but is not limited to, a randomized search of the parameter collection 1700, possibly constrained by feasibility relationships. The randomized search may be augmented by a local search of candidate neighborhoods discovered by the randomized search.

The parameter collection 1700 may have more than one instance. Differing operating conditions within the hard disk drive 10 may use differing instances. Such differing operating conditions may involve ambient temperature.

The optimizing 2252 of FIG. 9A may be part of the process of manufacturing the hard disk drive 10 of FIG. 1B to 4A, and 5. The hard disk drive 10, resulting from the manufacturing process is part of the invention.

Figure 10A:
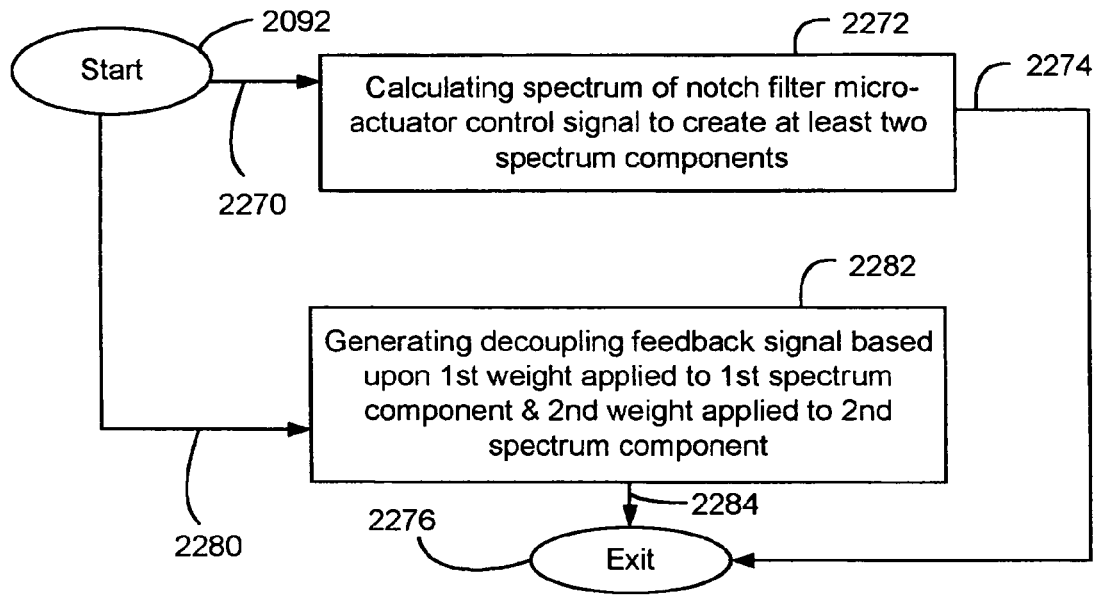
FIG. 10A shows a detail flowchart of FIGS. 6B and 6C, supporting the decoupling feedback filtering of FIGS. 1C and 1D of the notch filtered micro-actuator signal to create the decoupling feedback signal.

FIG. 10A shows a detail flowchart of operation 2092 of FIGS. 6B and 6C, supporting the decoupling feedback filtering 260 of FIGS. 1C and 1D of the notch filtered micro-actuator signal 256 to create the decoupling feedback signal 262.

In FIG. 10A, operation 2272 supports calculating a spectrum of the notch filtered micro-actuator control signal 256 to create at least two spectrum components 1552 and 1554, as shown in FIG. 9E. These spectrum components 1552 and 1554 are preferably contained in the decoupling feedback buffer 1550, residing in the servo memory 1040 as shown in FIG. 2.

In FIG. 10A, operation 2282 generates the decoupling feedback signal 262 of FIGS. 1C and 1D based upon a first weight 1622 of FIG. 9C applied to the first spectrum component 1552 and a second weight 1624 applied to the second spectrum component 1554. Typically, applying a weight to a spectrum component involves approximating the multiplication of the weight by the spectrum component. The decoupling feedback signal 262 is typically formed from the sum of these applications.

Figure 10B:
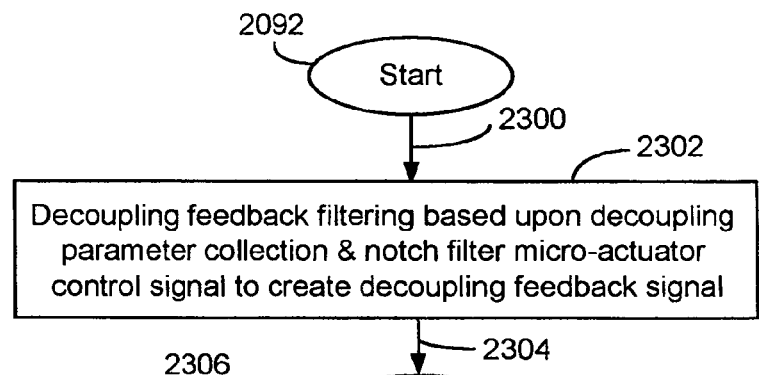
FIG. 10B shows a detail flowchart of FIGS. 6B and 6C further supporting the decoupling feedback filter of FIGS. 1B, 1C, 6A, 6D, and 8A.

FIG. 10B shows a detail flowchart of operation 2092 of FIG. 6B and 6C further supporting the decoupling feedback filter 260 of FIGS. 1B, 1C, 6A, 6D, and 8A. Operation 2302 supports decoupling feedback filtering 260, based upon a decoupling parameter collection 1620 of FIG. 2. The decoupling feedback filter 260 receives the notch filtered micro-actuator control signal 256 to create a decoupling feedback signal 262.

Figure 10C:
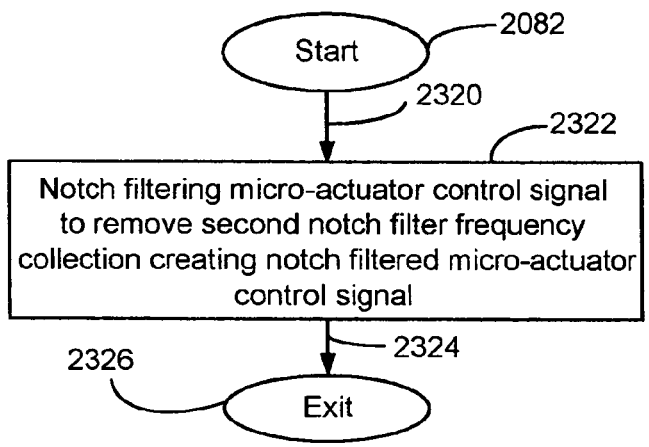
FIG. 10C shows a detail flowchart of FIGS. 6B and 6C further supporting the notch two filtering of FIGS. 1C and 1D.
Figure 10D:
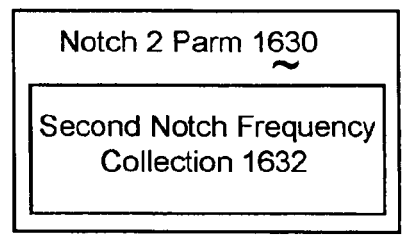
FIG. 10D shows the notch two parameter collection 1630 of FIGS. 2 and 9D.

FIG. 10C shows a detail flowchart of operation 2082 of FIG. 6B and 6C further supporting the notch two filtering 280 of FIGS. 1C and 1D. Operation 2322 supports the notch two filtering 280, removing a second notch filter frequency collection 1592 from the micro-actuator control signal 252 of FIGS. 1C and 1D to create the notch filtered micro-actuator control signal 256. The second notch filter frequency collection 1632 is shown in FIG. 10D.

FIG. 10D shows the notch two parameter collection 1630 of FIGS. 2 and 9D. The notch two parameter collection 1630 preferably includes the second notch frequency collection 1632. The second notch frequency collection 1632 preferably includes at least one and often preferably two members.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method comprising the step of
controlling a magnetic head to follow a track on a rotating disk surface in a hard disk drive, comprising the steps:
a micro-actuator control (250) creating a micro-actuator control signal (252) based upon a micro-actuator direction (204) to stimulate a micro-actuator (310);
wherein said magnetic head is positioned near said track by an effect of said micro-actuator and by an effect of a voice coil motor (300), both included said hard disk drive;
a voice coil motor control (220) creating a voice coil control signal (222) based upon a voice coil motor direction (212);
amplifying (240) said voice coil control signal based upon a tuning gain (244) to create a tuned voice coil control signal (242) stimulating said voice coil motor (300);
removing (200) a Positional Error Signal (PES) from a track following command (202) to create said micro-actuator direction (204); wherein said PES signal is based upon said effect of said voice coil motor and based upon said effect of said micro-actuator in positioning said magnetic head near said track;
decoupling feedback filtering (260) said micro-actuator control signal to create a decoupling feedback signal (262); and
removing (210) said PES and said decoupling feedback signal from said track following command to create said voice coil motor direction.

2. The method of claim 1, wherein the step of amplifying further comprises the steps:
setting a gain parameter of an amplifier based upon said tuning gain; and
providing said amplifier a version of said voice coil control signal to at least partly create said tuned voice coil control signal.

3. The method of claim 2, wherein the step of providing said amplifier comprises the step:
providing said voice coil control signal to a Digital to Analog Converter (DAC) to at least partly create said version of said voice coil control signal.

4. The method of claim 1, wherein the step of decoupling feedback filtering comprising the steps:
calculating a spectrum of said micro-actuator control signal to create at least two spectrum components; and
generating said decoupling feedback signal based upon a first weight applied to a first of said spectrum components and a second weight applied to a second of said spectrum components.

5. The method of claim 4, wherein at least one of said spectrum components is outside the bandwidth of said voice coil motor control.

6. The method of claim 4, wherein at least one of said spectrum components is outside the bandwidth of said micro-actuator control.

7. The method of claim 1, wherein the step decoupling feedback filtering is further comprised of the step:
decoupling feedback filtering, based upon a decoupling parameter collection, said micro-actuator control signal to create a decoupling feedback signal;
wherein said decoupling parameter collection includes at least one decoupling parameter.

8. The method of claim 7, further comprising the step:
optimizing a parameter collection based upon a spectrum of said PES using said parameter collection;
wherein said parameter collection includes said tuning gain and said decoupling parameter collection.

9. The method of claim 1, wherein the step amplifying said voice coil control signal, further comprises the steps:
notch one filtering said voice coil control signal to remove at least one significant second excitation resonance to create a notch filtered voice coil control signal; and
amplifying said notch filtered voice coil control signal based upon a tuning gain to create said tuned voice coil control signal stimulating said voice coil motor.

10. The method of claim 9, wherein the step of notch one filtering further comprises the step:
notch one filtering said voice coil control signal to remove a first of said significant first excitation resonances and to remove a second of said significant first excitation resonances to create said notch filtered voice coil control signal.

11. The method of claim 10, wherein said first of said significant first excitation resonance corresponds to a peak in the Non Repeatable Run-Out (NRRO) spectrum of said PES.

12. The method of claim 11, wherein said peak is outside a bandwidth of said voice coil motor control.

13. The method of claim 10, wherein said significant second excitation resonance corresponds to a peak in the Non Repeatable Run-Out (NRRO) spectrum of said PES.

14. The method of claim 13, wherein said peak is inside a bandwidth of said micro-actuator.

15. The method of claim 10, wherein said first of said significant first excitation resonances and said second of said significant first excitation resonances are related to at least one bending mode of said rotating disk surface.

16. The method of claim 9, wherein the step notch one filtering further comprises the step:
notch one filtering said voice coil control signal to remove a first notch filter frequency collection to create said notch filtered voice coil control signal;
wherein said first notch filter frequency collection includes at least one first notch filter frequency.

17. The method of claim 16, wherein said first notch filter frequency collection includes at least two of said first notch filter frequencies.

18. The method of claim 1, wherein the step said micro-actuator control signal creating said micro-actuator control signal, further comprises the step:
notch two filtering said micro-actuator control signal to create a notch filtered micro-actuator control signal to stimulate said micro-actuator; and
wherein the step decoupling feedback filtering, further comprises the step:
decoupling feedback filtering said notch filtered micro-actuator control signal to create said decoupling feedback signal.

19. The method of claim 18, wherein the step of notch two filtering further comprises the step:
notch two filtering said voice coil control signal to remove a first of said significant second excitation resonances and to remove a second of said significant second excitation resonances to create said notch filtered micro-actuator control.

20. The method of claim 19, wherein said first of said significant second excitation resonances and said second of said significant second excitation resonances are related to at least one bending mode of said rotating disk surface.

21. The method of claim 18, wherein the step of decoupling feedback filtering comprising the steps:
calculating a spectrum of said notch filtered micro-actuator control signal to create at least two spectrum components; and
generating said decoupling feedback signal based upon a first weight applied to a first of said spectrum components and a second weight applied to a second of said spectrum components.

22. The method of claim 21, wherein at least one of said spectrum components is outside the bandwidth of said voice coil motor control.

23. The method of claim 21, wherein at least one of said spectrum components is outside the bandwidth of said micro-actuator control.

24. The method of claim 18, wherein the step decoupling feedback filtering is further comprised of the step:
decoupling feedback filtering, based upon a decoupling parameter collection, said notch filtered micro-actuator control signal to create a decoupling feedback signal;
wherein said decoupling parameter collection includes at least one decoupling parameter;
wherein the step notch two filtering further comprises the step: notch two filtering said micro-actuator control signal to remove a second notch filter frequency collection to create said notch filtered voice coil control signal;
wherein said second notch filter frequency collection includes at least one notch two filter frequency.

25. The method of claim 24, wherein said second notch filter frequency collection includes at least two of said notch two filter frequencies.

26. The method of claim 24, further comprising the step:
optimizing a parameter collection based upon a spectrum of said PES using said parameter collection;
wherein said parameter collection includes a first notch filter frequency collection, said tuning gain, said second notch filter frequency collection, and said decoupling parameter collection.

27. The method of claim 1, wherein the step of amplifying further comprises the steps:
setting a gain parameter of an amplifier based upon said tuning gain; and
providing said amplifier a version of said notch filtered voice coil control signal to at least partly create said tuned voice coil control signal.

28. The method of claim 27, wherein the step of providing said amplifier comprises the step:
providing said notch filtered voice coil control signal to a Digital to Analog Converter (DAC) to at least partly create said version of said notch filtered voice coil control signal.

29. The method of claim 27, wherein the step of notch one filtering further comprises the step:
providing said notch filtered voice coil control signal to a Digital to Analog Converter (DAC) to at least partly create said version of said notch filtered voice coil control signal.

30. A program system, comprising at least one program step residing in a servo memory accessibly coupled with a servo-controller, at least partly implementing the method of claim 1, and said program system, further comprising the program steps:
performing said micro-actuator control signal to create said micro-actuator control signal based upon said micro-actuator direction; and performing said voice coil motor control to create said voice coil control signal based upon said voice coil motor direction.

31. The program system of claim 30, further comprising the program steps:
   decoupling feedback filtering said micro-actuator control signal to create said decoupling feedback signal.

32. The program system of claim 30, further comprising the program steps:
   removing said PES from said track following command to create said micro-actuator direction; and
   removing said PES and said decoupling feedback signal from said track following command to create said voice coil motor direction.

33. An apparatus within a hard disk drive, comprising:
   a micro-actuator control (250) including means for creating a micro-actuator control signal (252) based upon a micro-actuator direction (204);
   a voice coil motor control (220) including means for creating a voice coil control signal (222) based upon a voice coil motor direction (212);
   means for amplifying (240) said voice coil control signal based upon a tuning gain (244) to create a tuned voice coil control signal (242) stimulating a voice coil motor (300);
   means for removing (200) a Positional Error Signal (PES) from a track following command (202) to create said micro-actuator direction (204);
   means for decoupling feedback filtering (206) said micro-actuator control signal to create a decoupling feedback signal (262); and
   means for removing (210) said PES and said decoupling feedback signal from said track following command to create said voice coil motor direction.

34. The apparatus of claim 33, further comprising: a servo-controller directed by a program system including program steps residing in a servo-memory accessibly coupled with said servo-controller;
   wherein said micro-actuator control is comprised of the program step:
   creating (2012) said micro-actuator control signal based upon said micro-actuator direction; and
   wherein said voice coil motor control is comprised of the program step:
   creating (2022) said voice coil control signal based upon said voice coil motor direction.

\* \* \* \* \*